United States Patent
Buckmann et al.

(10) Patent No.: US 7,358,294 B2
(45) Date of Patent: Apr. 15, 2008

(54) AQUEOUS POLYURETHANE COATING COMPOSITIONS

(75) Inventors: Alfred Jean Paul Buckmann, Waalwijk (NL); Emilio Martin, Waalwijk (NL); Gerardus Cornelis Overbeek, Waalwijk (NL); Johannes Ludovicus Martinus Van Hilst, Waalwijk (NL); John Christopher Padget, Frodsham (GB); Pablo Steenwinkel, Waalwijk (NL); Tom Annable, Manchester (GB); Ronald Tennebroek, Waalwijk (NL)

(73) Assignee: DSM IP Assets BV, Heerlen (NL)

( * ) Notice: Subject to any disclaimer, the term of this patent is extended or adjusted under 35 U.S.C. 154(b) by 301 days.

(21) Appl. No.: 10/398,384

(22) PCT Filed: Oct. 11, 2001

(86) PCT No.: PCT/GB01/04523

§ 371 (c)(1),
(2), (4) Date: Apr. 4, 2003

(87) PCT Pub. No.: WO02/32980

PCT Pub. Date: Apr. 25, 2002

(65) Prior Publication Data

US 2004/0014922 A1  Jan. 22, 2004

(30) Foreign Application Priority Data

Oct. 14, 2000  (GB) .................................. 0025214.8

(51) Int. Cl.
*C08G 18/04*  (2006.01)

(52) U.S. Cl. .................. 524/507; 525/123; 524/589
(58) Field of Classification Search ................ 525/123; 524/507, 589
See application file for complete search history.

(56) References Cited

U.S. PATENT DOCUMENTS

| 4,209,425 A | * | 6/1980 | Lin et al. ..................... 252/510 |
| 4,983,662 A | * | 1/1991 | Overbeek et al. ........... 524/501 |
| 5,554,686 A | * | 9/1996 | Frisch et al. ................. 524/588 |
| 6,462,127 B1 | * | 10/2002 | Ingrisch et al. ............. 524/589 |
| 6,548,588 B1 | * | 4/2003 | Coogan et al. ............. 524/457 |

FOREIGN PATENT DOCUMENTS

| DE | 43 28 092 | | 2/1995 |
| DE | 198 22 468 A1 | | 11/1999 |
| EP | 1 026 186 A1 | | 8/2000 |
| FR | 2 549 078 A | | 1/1985 |
| GB | 2 298 427 B | | 9/1996 |
| WO | WO 00/24837 | | 5/2000 |
| WO | WO 00/27938 | | 5/2000 |
| WO | 00/37518 | * | 6/2000 |

* cited by examiner

*Primary Examiner*—Kuo-Liang Peng
(74) *Attorney, Agent, or Firm*—Morgan, Lewis & Bockius LLP

(57) ABSTRACT

An aqueous coating composition comprising a crosslinkable water-dispersible polyurethane oligomer wherein said composition when drying to form a coating has an open time of at least 20 minutes, a wet-edge time of at least 10 minutes, a tack free time of <20 hours and an equilibrium viscosity of <5,000 Pa·s at a solids content when drying in the range of from 20 to 55 wt % using a shear rate in the range of from $9\pm0.5$ to $90\pm5$ s$^{-1}$ and at $23+2°$ C.

5 Claims, 2 Drawing Sheets

Shear rate = 9.97 s-1

Shear rate = 78.6 s-1

AQUEOUS POLYURETHANE COATING COMPOSITIONS

The present invention relates to certain aqueous ambient temperature crosslinkable and shelf stable polyurethane polymer compositions which, inter alia, provide coatings having improved open and wet edge times as well as good tack-free times.

A general need when applying a decorative or protective coating to a substrate is to be able to repair irregularities in the still-wet coating after some time has elapsed, for example by re-brushing over a freshly coated wet substrate, or by applying more of the coating composition over a previously coated substrate either over the main area of the coating or an edge of the coating or even blending a drop into the coating without in each case vitiating the complete merging of any boundaries in the vicinity of the repaired irregularity. Traditionally compositions containing binder polymers dissolved in organic solvents are used and the organic solvents are employed to modify the drying characteristics of the coated composition. For example, organic solvent based alkyds with an open time of 30 to 45 minutes are available in the decorative "Do-it-Yourself" DIY market. However the disadvantage of organic solvent based coatings is the toxic and flammable nature of such solvents and the pollution and odour caused on evaporation as well as the relatively high cost of organic solvents.

Thus with the continuing concern about the use of organic solvent based coating compositions there has been a long felt need for an aqueous coating composition with comparable properties to those achievable using organic solvent based compositions.

Unfortunately, aqueous polymer coating compositions currently known to the art do not offer a combination of drying properties which would make them fully comparable (or even superior to) solvent-based coatings, and in particular do not provide desirably long open and wet edge times (as discussed above and also later) together with desirably short tack-free times (discussed later).

Thus, very commonly, aqueous-based polymer coating compositions employ dispersed high molecular weight polymers as the binder materials thereof. This results in, inter alia, a short wet edge time when the coating composition is dried because the dispersed polymer particles tend to coalesce in the edge region of an applied coating very soon after a wet coating has been applied (probably due to the maximum packing fraction of the polymer particles having been reached) to form a continuous film, and since the polymer of this film is of high viscosity because of its highly molecular weight, the lapping (i.e. wet edge) time of the composition is poor.

It has been shown by viscosity measurements taken during drying that existing alkyd emulsions have a high viscosity phase inversion peak during drying. (Phase inversion is defined as the transition from a binder in a continuous water phase to water in a continuous binder phase which occurs during drying). The consequence is a difficulty in re-brushing which starts a few minutes after application of the coating.

It is known from the prior art that longer wet edge or open time is achievable by using solution-type aqueous oligomers (U.S. Pat. No. 4,552,908) which can be diluted with large amounts of organic solvent(s) in order to create a low viscosity continuous phase during drying of the film. However, these systems have high Volatile Organic Contents (VOC's) and are generally unacceptably water-sensitive.

Open time can also be prolonged by using evaporation suppressants (such as e.g. eicosanol), as described in for example EP 210747. However, water sensitivity is also a problem in this case. Moreover, the wet edge open time is insufficiently improved by using such evaporation suppressants.

From the literature it is also known that open time is easily prolonged by using low solids contents in the aqueous polymer compositions, but this generally results in the need to apply many layers of paint (for good opacity). In addition, the wet edge time is generally only moderately influenced by reducing the solids content of an aqueous coating composition with water.

Longer times for repairing irregularities can be achieved by employing aqueous polymer coating compositions in which the binder polymers have very low viscosities. However, hitherto, a problem with using such low viscosity polymer binders, is that the resultant coatings have a slow drying rate, resulting in the coating remaining tacky for an unacceptably long time. A coating should preferably also dry sufficiently quickly to avoid the adherence of dust and to ensure that the coating quickly becomes waterproof (in case of outdoor applications), and, as discussed above, quickly becomes tack-free.

Indeed, the difficulty in developing aqueous polymer coating compositions having a desirable combination of drying properties when coated onto a substrate has been particularly discussed in a recent interview given by Professor Rob van der Linde (Professor of Coatings Technology, University of Technology, Eindhoven, NL) and Kees van der Kolk (Sigma Coatings) and reported in "Intermediair" Oct. 6, 1999, 35(23), pages 27-29. In this interview, concerning environmentally friendly paints, there is described the problem of applying aqueous paints where even the professional painter has little enough time to correct any irregularities when needed. This is contrasted (in the interview) with solvent-based paints (e.g. alkyd paints) which are workable for a much longer time but have the disadvantage that the organic solvents, forming a major component of such compositions, are toxic and expensive. The interview also mentions that in the coming years, three universities will cooperate in a project to overcome the drying disadvantages of aqueous paints. Thus this interview emphasises the current and continuing need and desirability for achieving aqueous polymer coatings compositions having improved drying properties.

The open time for a coating composition is, in brief, the period of time that the main area (the bulk) of an applied aqueous coating remains workable after it has been applied to a substrate, in the sense that during this period re-brushing or application of more coating over the main area of a freshly coated wet substrate is possible without causing defects such as brush marks in the final dried coating. (A more formal definition of open time is provided later in this specification).

The wet edge time for a coating composition is, in brief, the period of time that the edge region of an applied aqueous coating remains workable after it has been applied to a substrate, in the sense that during this period re-brushing or application of more coating over the edge region of a freshly coated wet substrate is possible without causing defects such as lap lines in the final dried coating. (A more formal definition of wet edge time is provided later in this specification).

U.S. Pat. No. 5,104,707, U.S. Pat. No. 5,039,732 and WO 00/27938 disclose the preparation of uralkyd modified polyurethanes and WO 00/24837 discloses a polyurethane/acrylate dispersion blended with a polyurethane with oxidatively drying groups; however the maximum open time was only 7 minutes, and, in particular, a wet edge time of only 4 minutes was achieved, neither of which is sufficient for most decorative purposes.

U.S. Pat. No. 4,552,908 describes a solids/viscosity relationship of oligomers with defined molecular weight upon drying coatings applied from compositions containing the oligomers. The compositions have >10 minutes wet edge time, but there is no mention that the oligomers are crosslinkable (an important feature of the present invention, see later). All oligomers mentioned in the patent are very water-sensitive.

We have now invented aqueous polymer coating compositions having a very advantageous combination of drying properties, particularly with regard to open time, wet edge time and tack-free time as discussed above, and which (surprisingly in view of the comments by van der Linde and van der Kolk) avoid the drawbacks of the currently available compositions.

According to the present invention there is provided an aqueous coating composition comprising a crosslinkable water-dispersible polyurethane oligomer(s) wherein said composition when drying to form a coating has the following properties:
 i) an open time of at least 20 minutes;
 ii) a wet-edge time of at least 10 minutes;
 iii) a tack-free time of $\leq 20$ hours;
 iv) 0 to 25% of co-solvent by weight of the composition; and
 v) an equilibrium viscosity of $\leq 5,000$ Pa·s, at any solids content when drying in the range of from 20 to 55% by weight of the composition, using any shear rate in the range of from $9\pm0.5$ to $90\pm5$ s$^{-1}$ and at $23\pm2°$ C.

Open time is more formally defined as the maximum length of time, using the test method and under the specified conditions described later, in which a brush carrying the aqueous composition of the invention can be applied to the main area of a coating of the aqueous composition of the invention after which the coating flows back so as to result in a homogenous film layer.

Preferably the open time is at least 25 minutes, more preferably at least 30 minutes and most preferably at least 35 minutes.

Wet edge time is more formally defined as the maximum length of time, using the test method under the specified conditions described herein, in which a brush carrying the aqueous composition of the invention can be applied to the edge region of a coating of the aqueous composition of the invention after which the coating flows back without leaving any lap lines in the final dried coating, so as to result in a homogenous film layer.

Preferably the wet-edge time is at least 12 minutes, more preferably at least 15 minutes, most preferably at least 18 minutes and especially at least 25 minutes.

The drying process of an applied invention composition can be divided in four stages namely the periods of time necessary to achieve respectively, dust-free, tack-free, sandable and thumb-hard coatings using the tests described herein.

Preferably the dust free time is $\leq 4$ hours, more preferably $\leq 2$ hours and still more preferably $\leq 50$ minutes.

Preferably the tack-free time is $\leq 15$ hours, more preferably $\leq 12$ hours and still more preferably $\leq 8$ hours.

Preferably the thumb hard time is $\leq 48$ hours, more preferably $\leq 24$ hours, more preferably less than 16 hours and especially $\leq 10$ hours.

Preferably the resultant coating is sandable within 72 hours, more preferably within 48 hours, still more preferably within 24 hours and especially within 16 hours.

A co-solvent, as is well known in the coating art, is an organic solvent employed in an aqueous composition to improve the drying characteristics thereof. The co-solvent may be solvent incorporated or used during preparation of the polyurethane oligomer(s) or may have been added during formulation of the aqueous composition.

The equilibrium viscosity of the aqueous coating composition when measured under the conditions, as described above, is a suitable method for illustrating the drying characteristics of the aqueous coating composition. By the equilibrium viscosity of an aqueous composition at a particular shear rate and solids content is meant the viscosity measured when the aqueous composition has been subjected to the shear rate at for long enough to ensure that the viscosity measurement has reached a constant value.

If the composition is to remain brushable and workable during drying so that it has the desired open time and wet edge time, it is necessary that its equilibrium viscosity does not exceed defined limits during the drying process and hence over a range of solids contents. Accordingly the crosslinkable water-dispersible polyurethane oligomer(s) which are used in this invention do not give a significant phase inversion viscosity peak, if any at all, during the drying process when the system inverts from one in which water is the continuous phase to one in which the crosslinkable water-dispersible polyurethane oligomer(s) is the continuous phase.

The shear rate to measure the equilibrium viscosity is preferably any shear rate in the range of from $0.9\pm0.05$ to $90\pm5$ s$^{-1}$, more preferably any shear rate in the range of from $0.09\pm0.005$ to $90\pm5$ s$^{-1}$.

Preferably the equilibrium viscosity of the aqueous coating composition of the invention is $\leq 3000$ Pa·s, more preferably $\leq 1500$ Pa·s, still more preferably $\leq 500$ Pa·s, especially $\leq 100$ Pa·s, and most especially $\leq 50$ Pa·s when measured as defined above.

Preferably, the composition of the invention has an equilibrium viscosity $\leq 5,000$ Pa·s when measured using any shear rate in the range of from $0.09\pm0.005$ to $90\pm5$ s$^{-1}$, and an equilibrium viscosity of $\leq 3,000$ Pa·s when measured using any shear rate in the range of from $0.9\pm0.05$ to $90\pm5$ s$^{-1}$, and an equilibrium viscosity of $\leq 1,500$ Pa·s when measured using any shear rate in the range of from $9\pm0.5$ to $90\pm5$ s$^{-1}$, at any solids content when drying in the range of from 20 to 55% by weight of the composition and at $23\pm2°$ C.

More preferably, the composition of the invention has an equilibrium viscosity of $\leq 3,000$ Pa·s when measured using any shear rate in the range of from $0.09\pm0.005$ to $90\pm5$ s$^{-1}$, and an equilibrium viscosity of $\leq 1,500$ Pa·s when measured using any shear rate in the range of from $0.9\pm0.05$ to $90\pm6$ s$^{-1}$, and an equilibrium viscosity of $\leq 500$ Pa·s when measured using any shear rate in the range of from $9\pm0.5$ to $90\pm5$ s$^{-1}$, at any solids content when drying in the range of from 20 to 55% by weight of the composition and at $23\pm2°$ C.

Even more preferably, the composition of the invention has an equilibrium viscosity of $\leq 1,500$ Pa·s when measured using any shear rate in the range of from $0.09\pm0.005$ to $90\pm5$ s$^{-1}$, and an equilibrium viscosity of $\leq 200$ Pa·s when measured using any shear rate in the range of from $0.9\pm0.05$ to $90\pm5$ s$^{-1}$, and an equilibrium viscosity of $\leq 100$ Pa·s when measured using any shear rate in the range of from $9\pm0.5$ to 90±5 s⁻¹, at any solids content when drying in the range of from 20 to 55% by weight of the composition and at 23±2° C.

Preferably the solids content of the aqueous coating composition when determining the equilibrium viscosity is in the range of from 20 to 60%, more preferably in the range of from 20 to 65%, still more preferably in the range of from 20 to 70%, especially in the range of from 20 to 75% by weight of the composition.

Preferably the equilibrium viscosity of the composition of the invention is $\leq 5000$ Pa·s, more preferably $\leq 3000$ Pa·s when measured using any shear range in the range of from $0.9\pm 0.05$ to $90\pm 5$ s⁻¹, more preferably using any shear rate in the range of from $0.09\pm 0.005$ to $90\pm 5$ s⁻¹; after a 12%, preferably a 15% and most preferably an 18% increase in the solids content by weight of the composition when drying (e.g a 12% increase means going from a solids content of 35 to 47% by weight of the composition).

In a preferred embodiment of the present invention said polyurethane oligomer(s) has a solution viscosity $\leq 150$ Pa·s, as determined from a 80% by weight solids solution of the crosslinkable polyurethane oligomer(s) in at least one of the solvents selected from the group consisting of N-methylpyrrolidone, n-butylglycol and mixtures thereof, using a shear rate of $90\pm 5$ s⁻¹ and at $50\pm 2°$ C.

A choice of solvents for determining the solution viscosity of the polyurethane oligomer(s) is provided herein because the nature of the polyurethane oligomer(s) may affect its solubility.

Preferably the solution viscosity of the crosslinkable polyurethane oligomer(s) is $\leq 100$ Pa·s, especially $\leq 50$ Pa·s and most especially $\leq 30$ Pa·s when measured as defined above.

Alternatively in this embodiment of the invention, and more preferably, the solution viscosity of the polyurethane oligomer(s) may be measured at $23\pm 2°$ C., and the crosslinkable polyurethane oligomer(s) may thus also be described as preferably having a solution viscosity $\leq 250$ Pa·s, as determined from a 70% by weight solids solution of the crosslinkable polyurethane oligomer(s) in a solvent mixture consisting of:

i) at least one of the solvents selected from the group consisting of N-methylpyrrolidone, n-butylglycol and mixtures thereof;

ii) water and iii) N,N-dimethylethanolamine;

where i), ii) and iii) are in weight ratios of 20/7/3 respectively, using a shear rate of $90\pm 5$ s⁻¹ and at $23\pm 2°$ C.

Preferably in the preceding alternative the solution viscosity of the crosslinkable polyurethane oligomer(s) is $\leq 100$ Pa·s, more especially $\leq 50$ Pa·s, still more especially $\leq 35$ Pa·s and most especially $\leq 20$ Pa·s, when measured as defined herein at $23\pm 2°$ C.

If a mixture of N-methylpyrrolidone (NMP) and n-butylglycol (BG) is used, preferably the ratio of NMP:BG is in the range of from 0.01:99.9 to 99.9:0.01, more preferably the ratio of NMP:BG is in the range of from 0.01:99.9 to 10:90 and in the range of from 90:10 to 99.9:0.01, and most preferably the ratio of NMP:BG is in the range of from 0.5:99.5 to 5:95 and in the range of from 95:5 to 99.5:0.5.

In a special embodiment of the present invention the wet edge time in minutes of the aqueous coating composition is at least Q/(wt. % solids of the aqueous coating composition)$^{0.5}$, wherein the solids content of the aqueous coating composition is between 15 and 70 wt. %, more preferably between 30 and 65 wt. % and most preferably between 40 and 60 wt. % and Q is a constant of 84, more preferably of 100, most preferably of 126 and especially of 151.

The crosslinkable polyurethane oligomer(s) may crosslink at ambient temperature by a number of mechanisms including but not limited to autoxidation, Schiff base crosslinking and silane condensation. By crosslinking by autoxidation is meant that crosslinking results from an oxidation occurring in the presence of air and usually involves a free radical mechanism and is preferably metal-catalysed resulting in covalent crosslinks. By Schiff base crosslinking is meant that crosslinking takes place by the reaction of a carbonyl functional group(s), where by a carbonyl functional group herein is meant an aldo or keto group and includes an enolic carbonyl group such as is found in an acetoacetyl group with a carbonyl-reactive amine and/or hydrazine (or blocked amine and/or blocked hydrazine) functional group. Examples of carbonyl-reactive amine (or blocked amine) functional groups include ones provided by the following compounds or groups: R—NH₂, R—O—NH₂, R—O—N=C<, R—NH—C(=O)—O—N=C< and R—NH—C(=O)—O—NH₂ where R is optionally substituted $C_1$ to $C_{15}$ preferably $C_1$ to $C_{10}$ alkylene, optionally substituted alicyclic or optionally substituted aryl or R may also be part of a polymer. Examples of carbonyl-reactive hydrazine (or blocked hydrazine) compounds or groups include R—NH—NH₂, R—C(=O)—NH—NH₂, R—C(=O)—NH—N=C<, R—NH—C(=O)—NH—NH₂ and R—NH—C(=O)—NH—N=C< where R is as described above. By silane condensation is meant the reaction of alkoxy silane or —SiOH groups in the presence of water, to give siloxane bonds by the elimination of water and/or alkanols (for example methanol) during the drying of the aqueous coating composition.

Preferably the crosslinkable polyurethane oligomer(s) is a self-crosslinkable polyurethane oligomer(s) (i.e. crosslinkable without the requirement for added compounds which react with groups on the polyurethane oligomer(s) to achieve crosslinking—although these can still be employed if desired). Preferably the crosslinking is by autoxidation, optionally in combination with other crosslinking mechanisms as discussed herein. Suitably autoxidation is provided for example by fatty acid groups containing unsaturated bonds (by which is meant the residue of such fatty acids which have become incorporated into the polyurethane oligomer by reaction at their carboxylic acid groups) or by (meth)allyl functional residues, β-keto ester groups or β-keto amide groups. Preferably autoxidation is provided at least by fatty acid groups containing unsaturated bonds.

Preferably the concentration of unsaturated fatty acid groups if present in the autoxidisably crosslinkable polyurethane oligomer(s) is 10 to 80%, more preferably 12 to 70%, most preferably 15 to 60% by weight based on the weight of the polyurethane oligomer(s). If combined with other autoxidisable groups in the aqueous coating composition, the fatty acid content may more readily be below 10% by weight of the polyurethane oligomer(s). For the purpose of determining the fatty acid group content of the polyurethane oligomer (s), it is convenient for practical purposes to use the weight of the fatty acid reactant including the carbonyl group but excluding the hydroxyl group of the terminal acid group of the fatty acid. Suitable unsaturated fatty acids for providing fatty acid groups in the oligomer(s) include fatty acids derived from vegetable oil or non-vegetable oil such as soyabean oil, palm oil, linseed oil, tung oil, rapeseed oil, sunflower oil, tallow oil, (dehydrated) castor oil, safflower oil and fatty acids such as linoleic acid, linolenic acid, palmitoleic acid, oleic acid, eleostearic acid, licanic acid, arachidonic acid, ricinoleic acid, erucic acid, gadoleic acid, clupanadonic acid and/or combinations thereof. Particularly preferred is a polyurethane oligomer(s) in which the autoxidisable groups are only derived from unsaturated fatty acids. Preferably at least 40% by weight, more preferably at least 60% by weight, of the unsaturated fatty acid groups contain at least two unsaturated groups.

Other crosslinking mechanisms known in the art include those provided by the reaction of epoxy groups with amino, carboxylic acid or mercapto groups, the reaction of mercapto groups with ethylenically unsaturated groups such as fumarate and acryloyl groups, the reaction of masked epoxy groups with amino or mercapto groups, the reaction of isothiocyanates with amines, alcohols or hydrazines, the reaction of amines (for example ethylenediamine or multifunctional amine terminated polyalkylene oxides) with β-diketo (for example acetoacetoxy or acetoamide) groups to form enamines. The use of blocked crosslinking groups may be beneficial.

The crosslinkable polyurethane oligomer(s) preferably contains a sufficient concentration of bound hydrophilic water-dispersing groups capable of rendering the oligomer(s) self-water-dispersible (i.e. dispersible in water without the requirement to use added dispersing agents) but the concentration of such groups is preferably not so great that the oligomer(s) has an unacceptably high water solubility in order to not compromise the water sensitivity of the final coating.

The type of hydrophilic groups capable of rendering the crosslinkable polyurethane oligomer(s) self-water-dispersible are well known in the art, and can be ionic water-dispersing groups or non-ionic water-dispersing groups. Preferred non-ionic water-dispersing groups are polyalkylene oxide groups, more preferably polyethylene oxide groups. A small segment of the polyethylene oxide group can be replaced by propylene oxide segment(s) and/or butylene oxide segment(s), however the polyethylene oxide group should still contain ethylene oxide as a major component. When the water-dispersible group is polyethylene oxide, the preferred ethylene oxide chain length is >4 ethylene oxide units, preferably >8 ethylene oxide units and most preferably >15 ethylene oxide units. Preferably the polyethylene oxide group has a Mw from 175 to 5000 Daltons, more preferably from 350 to 2200 Daltons, more preferably from 660 to 2200 Daltons. Preferably the polyurethane oligomer(s) has a polyethylene oxide content of 0 to 45% by weight, more preferably 0 to 30% by weight and most preferably 2 to 20% by weight.

Preferred ionic water-dispersing groups are anionic water-dispersing groups, especially carboxylic, phosphoric and or sulphonic acid groups. The anionic water-dispersing groups are preferably fully or partially in the form of a salt. Conversion to the salt form is optionally effected by neutralisation of the crosslinkable polyurethane oligomer(s) with a base, preferably during the preparation of the crosslinkable polyurethane oligomer(s) and/or during the preparation of the composition of the present invention. The anionic dispersing groups may in some cases be provided by the use of a monomer having an already neutralised acid group in the polyurethane oligomer(s) synthesis so that subsequent neutralisation is unnecessary. If anionic water-dispersing groups are used in combination with non-ionic water-dispersing groups, neutralisation may not be required.

If the anionic water-dispersing groups are neutralised, the base used to neutralise the groups is preferably ammonia, an amine or an inorganic base. Suitable amines include tertiary amines, for example triethylamine or N,N-dimethylethanolamine. Suitable inorganic bases include alkali hydroxides and carbonates, for example lithium hydroxide, sodium hydroxide, or potassium hydroxide. A quaternary ammonium hydroxide, for example $N^+(CH_3)_4OH^-$, can also be used. Generally a base is used which gives counter ions that may be desired for the composition. For example, preferred counter ions include $Li^+$, $Na^+$, $K^+$, $NH_4^+$ and substituted ammonium salts.

Cationic water dispersible groups can also be used, but are less preferred. Examples include pyridine groups, imidazole groups and or quaternary ammonium groups which may be neutralised or permanently ionised (for example with dimethylsulphate).

The crosslinkable polyurethane oligomer(s) preferably has a measured weight average molecular weight (Mw) in the range of from 1000 to 80,000 Daltons, more preferably in the range of from 1500 to 50,000 Daltons, and most preferably in the range of from 1500 to 20,000 Daltons. A typical range is from 1500 to 10,000 Daltons. For the purpose of this invention any molecular species with a molecular weight <1000 Daltons is classified as either a reactive diluent or plasticiser and is therefore not taken into account for the determination of Mn, Mw or PDi. Daltons as used herein are not a true molecular weight but a molecular weight measured against polystyrene standards as described below.

For polyurethane oligomer(s) with a low level of intermolecular interactions, like for example polyurethane oligomer(s) based on α,α'-tetramethylxylene diisocyanate (TMXDI) and preferably low levels of other hydrogen bridging groups like carboxylic acid groups, the higher Mw ranges are valid.

For polyurethane oligomer(s) with a high level of intermolecular interactions, like for example polyurethane oligomer(s) based on aromatic isocyanates with relatively higher levels of hydrogen bridging groups, the lower Mw ranges are most suitable.

Preferably a significant part of any crosslinking reaction only takes place after application of the aqueous coating composition to a substrate, to avoid an excessive molecular weight build up in the invention composition prior to such application (by precrosslinking) which may lead to unacceptably increased viscosity of the aqueous coating composition on the substrate in the early stages of drying.

The molecular weight limits suitable to obtain the preferred low solution viscosity of the crosslinkable polyurethane oligomer(s) (as defined above) depend in part on the amount and type of co-solvent if present in the aqueous composition of the invention. Thus a higher molecular weight limit is preferred when there is more co-solvent in the composition, and the lower molecular weight preferences are more applicable to low or zero co-solvent concentrations. Furthermore if a branched polyurethane oligomer(s) is used, higher molecular weight limits are preferred as branched structures tend to give a lower viscosity than a linear structure for any given Mw.

The molecular weight distribution (MWD) of the crosslinkable polyurethane oligomer(s) has an influence on the equilibrium viscosity of the aqueous composition of the invention, and hence an influence on the open time. MWD is conventionally described by the polydispersity index (PDi). PDi is defined as the weight average molecular weight divided by the number average molecular weight (Mw/Mn) where lower values are equivalent to lower PDi's. It has been found that a lower PDi often results in lower viscosities for a given Mw crosslinkable polyurethane oligomer(s). Preferably the value of PDi for an aliphatic polyurethane oligomer(s) is $\leq 15$, more preferably $\leq 10$, and most preferably $\leq 5$. In a preferred embodiment the value of $Mw \times PDi^{0.8}$ of the crosslinkable polyurethane oligomer(s) is $\leq 400,000$, more preferably the $Mw \times PDi^{0.8}$ is $\leq 300,000$ and most preferably the $Mw \times PDi^{0.8}$ is $\leq 220,000$.

The crosslinkable polyurethane oligomer(s) may comprise a single crosslinkable polyurethane oligomer or a mixture of crosslinkable polyurethane oligomers. The crosslinkable polyurethane oligomer(s) may optionally be used in conjunction with a crosslinkable oligomer(s) of a non-polyurethane type which has a solution viscosity within the same preferred limits as the solution viscosity of the polyurethane oligomer(s). Indeed up to 90% by weight of crosslinkable oligomer(s) in the invention composition may be of a non-polyurethane type. The crosslinkable oligomer(s) (polyurethane type plus, if present, non-polyurethane type) may optionally be used in conjunction with up to 250% by weight thereof of any type of non-crosslinkable oligomer (i.e. polyurethane and/or non-polyurethane type) provided that the non-crosslinkable oligomer(s) has a solution viscosity within the preferred ranges defined above for the solution viscosity of the crosslinkable polyurethane oligomer(s). In such cases, more preferably up to 120 wt % of the non-crosslinkable oligomer(s) (based on the weight of crosslinkable oligomer(s)) is used, more preferably up to 30 wt %, more preferably up to 10%, and most preferably 0%. Oligomer(s) of a non-polyurethane type include but are not limited to for example vinyl oligomer(s), polyamide oligomer(s), polyether oligomer(s), polysiloxane oligomer(s) and/or polyester oligomer(s) and the non-polyurethane type oligomer(s) may optionally be branched.

Methods for preparing polyurethanes are known in the art and are described in for example the Polyurethane Handbook $2^{nd}$ Edition, a Carl Hanser publication, 1994, by G. Oertel; and these methods are included herein by reference. The polyurethane oligomer(s) may be prepared in a conventional manner by reacting an organic polyisocyanate(s) with an isocyanate-reactive compound(s) by methods well known in the prior art. Isocyanate-reactive groups include —OH, —SH, —NH—, and —NH$_2$. In some preparations, an isocyanate-terminated polyurethane prepolymer is first formed which is then chain extended with an active hydrogen containing compound.

Crosslinkable polyurethane oligomer(s) containing crosslinker groups are preferably obtained by employing as a reactant in the urethane synthesis at least one isocyanate-reactive organic compound bearing a crosslinker group(s). Alternatively, but less preferably, an isocyanate functional compound bearing a crosslinker group(s) may be used. Polymer-bound hydrophilic water-dispersing groups, if present, are preferably introduced by employing as a reactant(s) in the urethane synthesis at least one isocyanate-reactive compound (or less preferably an isocyanate-functional compound(s)) bearing a hydrophilic dispersing group (s). Optionally, the reactants may also include isocyanate-reactive compound(s) such as organic polyol(s) bearing neither crosslinker groups nor hydrophilic water-dispersing groups.

A polyurethane oligomer(s) of acceptably low Mw may be made by capping an isocyanate-terminated polyurethane oligomer(s) with a monofunctional isocyanate-reactive compounds or by using a stoichiometric excess of reactant(s) having isocyanate-reactive groups during the oligomer preparation, thereby forming an isocyanate-reactive group (preferably —OH) terminated polyurethane oligomer. A combination of both techniques may be used.

When employing the prepolymer/chain extension route to form a polyurethane, an isocyanate-reactive organic compound bearing crosslinker groups may be introduced on the polyurethane oligomer backbone during the prepolymer formation and/or during the chain extension step.

Optionally, as mentioned above, isocyanate-reactive organic compounds bearing hydrophilic water-dispersing groups may be included in the polyurethane oligomer formation to provide the facility of self-dispersability in water of the crosslinkable polyurethane oligomer(s) and methods analogous to those for introducing crosslinker groups may be used (i.e. employing isocyanate-reactive or isocyanate-functional compounds bearing water-dispersing groups rather than crosslinker groups).

The crosslinker or water-dispersing groups may in fact be introduced into the polyurethane oligomer(s) using two general methods: i) (being the method which is most used) by utilising in the polymerisation process to form a polyurethane oligomer a polyfunctional and/or monofunctional compound carrying a crosslinker or water-dispersing group; or ii) (less often used) utilising a reactant in the urethane synthesis a compound bearing a selected reactive group, and subsequently reacting the precursor oligomer so formed with a compound carrying a crosslinker or water-dispersing group and also a reactive group of the type which will react with the selected reactive groups on the precursor oligomer to provide attachment of the crosslinker group or water-dispersing group to the polyurethane oligomer(s) via covalent bonding.

To prepare an autoxidisably crosslinkable polyurethane oligomer(s) preferably an isocyanate-reactive organic compound(s) bearing an unsaturated fatty acid group(s) as crosslinker group(s) may be used in the polyurethane oligomer(s) synthesis. Such isocyanate-reactive organic compounds bearing fatty acid groups may be obtained by using techniques known in the art, e.g. from the reaction of a suitable fatty acid with a hydroxyl donor (preferably an alcohol or polyol) or amine donor to provide a compound bearing fatty acid groups) and at least one (preferably at least two) isocyanate-reactive groups.

Suitable polyisocyanates include aliphatic, cycloaliphatic, araliphatic and/or aromatic polyisocyanates. Examples of suitable polyisocyanates include ethylene diisocyanate, 1,6-hexamethylene diisocyanate, isophorone diisocyanate, cyclohexane-1,4-diisocyanate, 4,4'-dicyclohexylmethane diisocyanate, p-xylylene diisocyanate, α,α'-tetramethylxylene diisocyanate, 1,4-phenylene diisocyanate, 2,4-toluene diisocyanate, 2,6-toluene diisocyanate, 4,4'-diphenylmethane diisocyanate, polymethylene polyphenyl polyisocyanates, 2,4'-diphenylmethane diisocyanate, 3(4)-isocyanatomethyl-1-methyl cyclohexyl isocyanate and 1,5-naphthylene diisocyanate. Mixtures of polyisocyanates can be used and also polyisocyanates which have been modified by the introduction of urethane, allophanate, urea, biuret, carbodiimide, uretonimine, urethdione or isocyanurate residues.

Other isocyanate-reactive organic compounds bearing neither crosslinker groups (such as unsaturated fatty acid groups) nor hydrophilic water-dispersing groups which may be used in the preparation of polyurethane oligomer(s) or polyurethane prepolymers preferably contain at least one (preferably at least two) isocyanate-reactive groups, and are more preferably organic polyols. The organic polyols particularly include diols and triols and mixtures thereof but higher functionality polyols may be used, for example as minor components in admixture with diols. The polyols may be members of any of the chemical classes of polyols used or proposed to be used in polyurethane formulations. In particular the polyols may be polyesters, polyesteramides, polyethers, polythioethers, polycarbonates, polyacetals, polyolefins or polysiloxanes. Preferred polyol molecular weights are from 250 to 6000, more preferably from 500 to 3000. Low molecular weight organic compounds containing at least one (preferably at least two) isocyanate-reactive groups and having a weight average molecular weight up to 500, preferably in the range of 40 to 250 can also be used. Examples include ethyleneglycol, neopentyl glycol, 1-propanol, and 1,4-cyclohexyldimethanol.

Hydrophilic water-dispersing groups are optionally incorporated into the polyurethane oligomer(s) by including an isocyanate-reactive and/or isocyanate functional compound(s) bearing a non-ionic and/or ionic hydrophilic water-dispersing group(s) (as described above) (or group which may be subsequently easily converted to such a water-dispersing group, e.g. by neutralisation, such a group still being termed a water dispersing group for the purposes of this invention) as a reactant in the preparation of the polyurethane oligomer or prepolymer. Examples of such compounds include carboxyl group containing diols and triols, for example dihydroxy alkanoic acids such as 2,2-dimethylolpropionic acid or 2,2-dimethylolbutanoic acid. Examples of preferred compounds bearing non-ionic hydrophilic water-dispersing groups include methoxy polyethylene glycol (MPEG) with molecular weights of for example 350, 550, 750, 1000 and 2000, as described in EP 0317258.

The polyurethane oligomer(s) preferably has an acid value in the range of from 0 to 50 mg KOH/g, more preferably in the range of from 0 to 40 mg KOH/g and most preferably in the range of from 10 to 35 mg KOH/g.

When an isocyanate-terminated polyurethane prepolymer is prepared, it is conventionally formed by reacting a stoichiometric excess of the organic polyisocyanate with the isocyanate-reactive compounds under substantially anhydrous conditions at a temperature between about 30° C. and about 130° C. until reaction between the isocyanate groups and the isocyanate-reactive groups is substantially complete; the reactants for the prepolymer are generally used in proportions corresponding to a ratio of isocyanate groups to isocyanate-reactive groups of from about 1.1:1 to about 6:1, preferably from about 1.5:1 to 3:1.

When a hydroxyl-terminated polyurethane oligomer(s) is prepared directly (i.e. not proceeding through the prepolymer/chain-extension route), it is conventionally formed by reacting a stoichiometric excess of the isocyanate-reactive compounds with the organic polyisocyanate under substantially anhydrous conditions at a temperature between about 30° C. and about 130° C. until reaction between the isocyanate groups and the isocyanate-reactive groups is substantially complete; the reactants for the oligomer are generally used in proportions corresponding to a ratio of isocyanate groups to isocyanate-reactive groups of from about 0.4:1 to about 0.99:1, preferably from about 0.55:1 to 0.95:1.

If desired, catalysts such as dibutyltin dilaurate and stannous octoate, zirconium or titanium based catalysts may be used to assist polyurethane oligomer(s) formation. An organic solvent may optionally be added before or after prepolymer or final oligomer formation to control the viscosity. Examples of solvents include water-miscible solvents such as N-methylpyrrolidone, dimethyl acetamide, glycol ethers such as butyldiglycol, methyl ethyl ketone and alkyl ethers of glycol acetates or mixtures thereof. Optionally no organic solvents are added.

The polyurethane oligomer(s) may be dispersed in water using techniques well known in the art. Preferably, the polyurethane oligomer(s) is added to the water with agitation or, alternatively, water may be stirred into the polyurethane oligomer(s).

An aqueous polyurethane oligomer(s) dispersion may also be prepared, when the urethane synthesis has employed the prepolymer/chain extension route, by dispersing the isocyanate-terminated polyurethane prepolymer (optionally carried in an organic solvent medium) in an aqueous medium (using surfactants, or more preferably by utilising the self-dispersability of the prepolymer if dispersing groups in a sufficient amount are present therein, although surfactants may still be employed if desired) and chain extending the prepolymer with active hydrogen-containing chain extender in the aqueous phase.

Active hydrogen-containing chain extenders which may be reacted with the isocyanate-terminated polyurethane prepolymer include amino-alcohols, primary or secondary diamines or polyamines, hydrazine, and substituted hydrazines.

Examples of such chain extenders useful herein include alkylene diamines such as ethylene diamine and cyclic amines such as isophorone diamine. Also materials such as hydrazine, azines such as acetone azine, substituted hydrazines such as, for example, dimethyl hydrazine, 1,6-hexamethylene-bis-hydrazine, carbodihydrazine, hydrazides of dicarboxylic acids and sulphonic acids such as adipic acid mono- or dihydrazide, oxalic acid dihydrazide, isophthalic acid dihydrazide, hydrazides made by reacting lactones with hydrazine such as gammahydroxylbutyric hydrazide, bis-semi-carbazide, and bis-hydrazide carbonic esters of glycols may be useful. Water itself may be effective as an indirect chain extender.

Where the chain extender is other than water, for example a polyamine or hydrazine, it may be added to the aqueous dispersion of the isocyanate-terminated polyurethane prepolymer or, alternatively, it may already be present in the aqueous medium when the isocyanate-terminated polyurethane prepolymer is dispersed therein. The isocyanate-terminated polyurethane prepolymer may also be chain extended to form the polyurethane oligomer(s) while dissolved in organic solvent (usually acetone) followed by the addition of water to the solution until water becomes the continuous phase and the subsequent removal of the solvent by distillation to form an aqueous dispersion.

Optionally a combination of chain extender(s) and chain terminator(s) may be used. Examples of chain terminators are mono-functional isocyanate-reactive compounds such as mono-alcohols, mono-amines, mono-hydrazines and mono-mercaptanes. The ratio of chain extender to chain terminator compounds is preferably in the range of from 95:5 to 5:95, more preferably 50:50 to 10:90 and most preferably 35:65 to 20:80.

The chain extension and/or chain termination can be conducted at elevated, reduced or ambient temperatures. Convenient temperatures are from about 5° C. to 95° C. or, more preferably, from about 10° C. to 60° C.

The total amount of chain extender and chain terminating materials employed (apart from water) should be such that the ratio of active hydrogens in the chain extender(s) to isocyanate groups in the polyurethane prepolymer preferably is in the range from 0.1:1 to 2.0:1 more preferably 0.80:1 to 1.7:1.

Any other known methods for preparing polyurethane dispersions such as a ketamine/ketazine process or a hot process as described in "Progress in Organic Coatings", D. Dietrich, 9, 1981, p 281) may also be utilised.

Surfactants and or high shear can be utilised in order to assist in the dispersion of the polyurethane oligomer(s) in water (even if it is self-dispersible). Suitable surfactants include but are not limited to conventional anionic, cationic and/or non-ionic surfactants such as Na, K and $NH_4$ salts of dialkylsulphosuccinates, Na, K and $NH_4$ salts of sulphated oils, Na, K and $NH_4$ salts of alkyl sulphonic acids, Na, K and $NH_4$ alkyl sulphates, alkali metal salts of sulphonic acids; fatty alcohols, ethoxylated fatty acids and/or fatty amides, and Na, K and $NH_4$ salts of fatty acids such as Na stearate and Na oleate. Other anionic surfactants include alkyl or (alk)aryl groups linked to sulphonic acid groups, sulphuric acid half ester groups (linked in turn to polyglycol ether groups), phosphonic acid groups, phosphoric acid analogues and phosphates or carboxylic acid groups. Cationic surfactants include alkyl or (alk)aryl groups linked to quaternary ammonium salt groups. Non-ionic surfactants include polyglycol ether compounds and polyethylene oxide compounds. The amount of surfactant used is preferably 0 to 15% by weight, more preferably 0 to 8% by weight, still more preferably 0 to 5% by weight, especially 0.1 to 3% by weight, and most especially 0.3 to 2% by weight based on the weight of the crosslinkable polyurethane oligomer(s).

The polyurethane oligomer(s) has at least one glass transition temperature (Tg) as measured by modulated differential scanning calorimetry (DSC), preferably being in the range of from −100 to 250° C., more preferably −80 to 150° C. and most preferably −70 to 130° C. and especially −70 to 30° C.

The aqueous composition of the invention may optionally but preferably include a polymer(s) dispersed therein which is not a crosslinkable polyurethane oligomer (or a non-polyurethane oligomer whether crosslinkable or non-crosslinkable) and has a Mw≧90,000 Daltons, herein termed a "dispersed polymer" for convenience. Preferably the weight average molecular weight of the dispersed polymer(s) Mw in the aqueous polymer dispersion is in the range of from 90,000 to 6,000,000, more preferably in the range of from 150,000 to 2,000,000, and especially in the range of from 250,000 to 1,500,000 Daltons. If the dispersed polymer(s) is fully precrosslinked its Mw will be infinite. Also, in some cases, the synthesis to form the crosslinkable polyurethane oligomer yields, in addition to the low molecular weight oligomer, an amount of very high molecular material. For the purposes of this invention, such material, produced in-situ, is to be considered as a dispersed polymer.

The Mw of the dispersed polymer(s) may be <90,000 Daltons, with the proviso that the solution viscosity of the dispersed polymer(s) is at least 150 Pa·s as determined from a 80% by weight solids solution of the dispersed polymer(s) in at least one of the one or other of two solvents selected from the group consisting of N-methylpyrrolidone, n-butylglycol and mixtures thereof using a shear rate of 90±5 $s^{-1}$ and at 50±2° C.

Preferably the solution viscosity (if measurable) of the dispersed polymer(s) when used in the aqueous composition of the invention is ≧250 Pa·s, more preferably ≧500 Pa·s, and especially ≧1000 Pa·s as determined from a 80% by weight solids solution of the dispersed polymer(s) in at least one of the solvents, from the group consisting of N-methylpyrrolidone, n-butylglycol and mixtures thereof using a shear rate of 90±5 $s^{-1}$ and at 50±2° C.

The solution viscosity of the dispersed polymer(s) may not be measurable if for example the weight average molecular weight is so high so as to render the dispersed polymer(s) insoluble in organic solvent(s) or if the dispersed polymer(s) is fully or partially crosslinked, again rendering it insoluble.

The dispersed polymer(s) may be film forming or non-film forming at ambient temperature; preferably the dispersed polymer(s) is non-film forming at ambient temperature (ambient temperature as used herein is defined as 23±2° C.). Preferably the aqueous composition of the invention does include such a dispersed polymer(s).

The crosslinkable polyurethane oligomer(s) can thus be (and preferably is) combined with a dispersed polymer(s) to further improve the provision of a binder system for providing an aqueous composition with the desired balance of long open/wet edge time and reduced tack free time.

The presence of the crosslinkable polyurethane oligomer(s) (as discussed above) provides the defined long open time and wet edge time, whilst the presence of the dispersed polymer(s) (e.g. in the form of a polymer latex) appears to assist in reducing the drying time of the composition, even though its presence may not always be essential to achieve the broadest scope of defined requirements in this respect.

Accordingly in a further, and preferred, embodiment of the present invention there is provided an aqueous coating composition as defined herein additionally comprising a dispersed polymer(s).

The dispersed polymer(s) may for example be the product of an aqueous emulsion polymerisation or a preformed polymer dispersed in water.

Preferably the dispersed polymer(s) has a measured Tg (using DSC) which is preferably in the range of from −50 to 300° C., and more preferably in the range of from 25 to 200° C. and especially in the range of from 35 to 125° C. If the dispersed polymer(s) is a vinyl polymer, the vinyl polymer may be a sequential polymer, i.e. the vinyl polymer will have more than one Tg. Especially preferred is a vinyl polymer with 10 to 50 wt. % of a soft part with a Tg in the range of from −30 to 20° C. and 50 to 90 wt. % of a hard part of with a Tg in the range of from 60 to 110° C. This combination provides an additional advantage of improved block resistance of the resultant coating, especially when co-solvent levels of 0 to 15 wt. %, more preferably 0 to 5 wt. % and most preferably 0 to 3 wt. %. of the aqueous composition are used. Blocking is the well-known phenomenon of coated substrates which are in contact tending to unacceptably adhere to each other, for examples doors and windows in their respective frames, particularly when under pressure, as for example in stacked panels.

Preferably the dispersed polymer(s) has an average particle size in the range of from 25 to 1000 nm, more preferably 60 to 700 nm, more preferably 100 to 600 nm and especially in the range of from 150 to 500 nm. The dispersed polymer(s) may also have a polymodal particle size distribution.

The dispersed polymer(s) may for example be a vinyl polymer, polyurethane (in some cases, an in-situ formed very high molecular polyurethane resulting from the urethane synthesis as discussed above), polyester, polyether, polyamide, polyepoxide, or a mixture thereof. The dispersed polymer(s) may also be a hybrid of two or more different polymer types such as urethane-acrylic polymers (as described in for example U.S. Pat. No. 5,137,961), epoxy-acrylic polymers and polyester-acrylic polymers. The dispersed polymer(s) may also be an organic-inorganic hybrid, for example silica particles grafted with a vinyl polymer(s). Preferably the dispersed polymer(s) is a vinyl polymer. Blends of dispersed polymers may of course also be used.

The dispersed polymer(s) may optionally contain acid groups. The preferred acid value of the dispersed polymer(s) depends on the type and molecular weight of crosslinkable polyurethane oligomer and (if present) the type of cosolvent used. If the crosslinkable polyurethane oligomer is hydrophilic, the cosolvent (if used) is preferably also of a hydrophilic nature and a low acid value of the dispersed polymer(s) is preferred (preferably below 60, more preferably below 40, still more preferably below 30, especially below 24, more especially below 19 and most especially below 15 mg KOH/g). If however a hydrophobic crosslinkable polyurethane oligomer is used, for instance based on (at least partly) unsaturated fatty acid and without dispersing groups, the co-solvent is preferentially of a hydrophobic nature (if at all present) and therefore much higher acid values (up to an acid value of 160, more preferably up to an acid value of 125, most preferably up to an acid value of 100 mg KOH/g) of the dispersed polymer(s) may be tolerated to give the desired properties.

In a special embodiment, ≦15 wt. % of a co-solvent (based on total binder polymer solids) where the binder includes the crosslinkable oligomer(s), non-crosslinkable oligomer(s) and any dispersed polymer(s) is used, where the dispersed polymer(s) has an acid value below 20 mg KOH/g and the crosslinkable polyurethane oligomer(s) is present in an amount (based on total binder polymer solids) of 35 to 65 wt. %, the crosslinkable polyurethane oligomer(s) comprising 45 to 70 wt. % of fatty acid groups.

The dispersed polymer(s) may optionally contain hydroxyl groups. If the dispersed polymer(s) is a vinyl polymer comprising polymerised (meth)acrylic monomers then preferably the hydroxyl group content in the vinyl polymer is preferably below 1.0 wt. %, more preferably below 0.5 wt. % and most preferably below 0.2 wt. % based on the weight of the vinyl polymer.

The dispersed polymer(s) may optionally contain amide groups (such groups being e.g. obtainable from amide functional monomers such as (meth)acrylamide). If the dispersed polymer(s) is a vinyl polymer comprising polymerised (meth)acrylamide monomers, then preferably the amide group content in the vinyl polymer is below 3.0 wt. %, more preferably below 1.5 wt. % and most preferably below 0.6 wt. % based on the weight of the vinyl polymer.

The dispersed polymer(s) may optionally contain wet-adhesion promoting groups such as acetoacetoxy groups, (optionally substituted) amine or urea groups, for example cyclic ureido groups, imidazole groups, pyridine groups, hydrazide or semicarbazide groups.

The dispersed polymer(s) may optionally contain crosslinker groups which allow independent crosslinking of the dispersed polymer(s) and/or allow participation in the crosslinking reaction of the crosslinkable polyurethane oligomer(s), thus speeding up the drying rate and improving the properties of the final coating (e.g. chemical resistance and scratch resistance). Examples of such crosslinker groups include groups which can take part in the autoxidation and groups which will effect crosslinking other than by autoxidation, for example by Schiff base and silane condensation reactions as discussed above for polyurethane oligomer(s).

In a preferred embodiment the dispersed polymer(s) contains crosslinker groups which can participate in the preferred autoxidative crosslinking reactions of an autoxidisably crosslinkable polyurethane oligomer(s).

In a preferred embodiment the dispersed polymer(s) may be fully or partially pre-crosslinked (i.e. fully or partially crosslinked while present in the invention aqueous coating composition and prior to applying a coating). If the dispersed polymer(s) is a vinyl polymer pre-crosslinking may be achieved by using polyunsaturated monomers during the vinyl polymer synthesis such as allyl methacrylate, diallyl phthalate, tripropylene glycol di(meth)acrylate, 1,4-butanediol diacrylate and trimethylol propane triacrylate. Allyl methacrylate is most preferred. Alternatively very low levels of initiator may be used, leading to chain-transfer to the vinyl polymer and hence to grafting and high Mw. Other ways to generate pre-crosslinking in a vinyl polymer is to include the use of monomer(s) bearing groups which may react with each other during synthesis to effect pre-crosslinking for example glycidylmethacrylate and acrylic acid.

Vinyl polymers are derived from free radically polymerisable olefinically unsaturated monomers (herein used as the definition of vinyl monomers) and can contain polymerised units of a wide range of such vinyl monomers, especially those commonly used to make binders for the coatings industry.

Examples of vinyl monomers which may be used to form vinyl polymer(s) include but are not limited to 1,3-butadiene, isoprene, styrene, α-methyl styrene, divinyl benzene, acrylonitrile, methacrylonitrile, vinyl halides such as vinyl chloride, vinylidene halides such as vinylidene chloride, vinyl esters such as vinyl acetate, vinyl propionate, vinyl laurate, and vinyl esters of versatic acid such as VeoVa 9 and VeoVa 10 (VeoVa is a trademark of Shell), heterocyclic vinyl compounds, alkyl esters of mono-olefinically unsaturated dicarboxylic acids (such as di-n-butyl maleate and di-n-butyl fumarate) and, in particular, esters of acrylic acid and methacrylic acid of formula $$CH_2=CR^1-COOR^2$$

wherein $R^1$ is H or methyl and $R^2$ is optionally substituted alkyl or cycloalkyl of 1 to 20 carbon atoms (more preferably 1 to 8 carbon atoms) examples of which are methyl acrylate, methyl methacrylate, ethyl acrylate, ethyl methacrylate, n-butyl acrylate, n-butyl methacrylate, 2-ethylhexyl acrylate, 2-ethylhexyl methacrylate, isopropyl acrylate, isopropyl methacrylate, n-propyl acrylate, n-propyl methacrylate, and hydroxyalkyl (meth)acrylates such as hydroxyethyl acrylate, hydroxyethyl methacrylate, 2-hydroxypropyl methacrylate, 2-hydroxypropyl acrylate, 4-hydroxybutyl acrylate, 4-hydroxybutyl methacrylate and their modified analogues like Tone M-100 (Tone is a trademark of Union Carbide Corporation).

Olefinically unsaturated monocarboxylic, sulphonic and/or dicarboxylic acids, such as acrylic acid, methacrylic acid, β-carboxy ethyl acrylate, fumaric acid and itaconic acid, and monomers such as (meth)acrylamide and methoxy polyethyleneoxide (meth)acrylate may also be used.

The vinyl monomer may optionally contain functional groups to contribute to the crosslinking of the vinyl polymer(s) in the coating. Examples of such groups include maleic, epoxy, fumaric, acetoacetoxy, β-diketone, unsaturated fatty acid, acryloyl, methacrylol, styrenic, (meth)allyl groups, mercapto groups, keto or aldehyde groups (such as methylvinylketone, diacetoneacrylamide and (meth)acroleine).

Particularly preferred are vinyl polymer(s) made from a monomer system comprising at least 40 wt. % of one or more monomers of the formula $CH_2=CR^1COOR^2$ defined above. Such preferred vinyl polymer(s) are defined herein as acrylic polymer(s). More preferably, the monomer system contains at least 50 wt. % of such monomers, and particularly at least 60 wt. %. The other monomers in such acrylic polymer(s) (if used) may include one or more of the other vinyl monomers mentioned above, and/or may include ones different to such other monomers. Particularly preferred monomers include butyl acrylate (all isomers), butyl methacrylate (all isomers), methyl methacrylate, ethyl hexyl methacrylate, esters of (meth)acrylic acid, acrylonitrile, vinyl acetate and styrene.

If the dispersed polymer(s) is a vinyl polymer, the dispersed vinyl polymer may in some embodiments comprise at least 15 wt. %, more preferably at least 40 wt. % and most preferably at least 60 wt. % of polymerised vinyl acetate. If the dispersed vinyl polymer comprises at least 50 wt. % of polymerised vinylacetate then preferably the dispersed vinyl polymer also comprises 1049 wt. % of either n-butylacrylate or a branched vinylester, for example Veova 10.

In a preferred embodiment the dispersed vinyl polymer comprises:

I. 15 to 60 wt. % of styrene and/or α-methylstyrene;
II. 15 to 80 wt. % of one or more of methyl methacrylate, ethyl methacrylate, cyclohexyl (meth)acrylate and n-butyl methacrylate;
III. 0 to 5 wt. %, more preferably 0 to 3.5 wt. %, of vinyl monomer(s) containing a carboxylic acid group(s);
IV. 0 to 10 wt. %, more preferably 0 to 5 wt. % of vinyl monomer(s) containing a non-ionic water-dispersing group(s);
V. 5 to 40 wt. % of vinyl monomer(s) other than as in I to IV, VI and VII;
VI. 0 to 5 wt. % of vinyl monomer(s) containing wet adhesion promoter or crosslinker groups (excluding any within the scope of III and VII); and
VII. 0 to 8 wt. %, more preferably 0 to 4 wt. %, and most preferably 0.5 to 3 wt. % of a polyethylenically unsaturated vinyl monomer, wherein I)+II) add up to at least 50 wt. % and I+II+III+IV+V+VI+VII add up to 100%.

The dispersed polymer(s) can be prepared by any known technique. Preparation techniques particularly include either dispersing a pre-formed polymer or polymer solution in water or if the dispersed polymer(s) is a vinyl polymer directly synthesising the vinyl polymer in water (for example by emulsion polymerisation, micro-suspension polymerisation or mini emulsion polymerisation). Methods for preparing aqueous dispersed polymer(s) are reviewed in the Journal of Coating Technology volume 66, number 839, pages 89-105 (1995) and these methods are included herein by reference. Preferably dispersed vinyl polymer(s) are prepared by the emulsion polymerisation of free radically polymerisable olefinically unsaturated monomers (Emulsion Polymerisation and Emulsion Polymers, P. Lovell, M. S. El-Aasser, John Wiley, 1997). Any published variant of the emulsion polymerisation process may be utilised to prepare the dispersed polymer(s), including the use of seeded emulsion polymerisation techniques to control particle size and particle size distribution, especially when working in the particle size range 300-700 nm when the seeded technique is useful for giving good particle size control. Other useful techniques are the so called sequential polymerisation technique and the power feed technique (chapter 23 in "Emulsion Polymers and Emulsion Polymerisation" D R Basset and A E Hamielec, ACS Symposium Series No 165,1981).

Preferably the dispersed polymer(s) is colloid stable and it is also desirable that colloid stability is maintained for as long as possible into the drying process since early loss of colloid stability can bring a premature end to open time. Since the final coating composition may often contain co-solvents and dissolved ionic species (e.g. from pigment dissolution and from the presence of neutralising agents), it is desirable that the colloid stability of the dispersed polymer(s) is adequate to withstand any destabilising influences of these components. Colloid stability may be achieved by the addition of conventional non-ionic surfactants, optionally with the addition of anionic surfactants at any stage during the preparation of the aqueous composition of the invention. Strongly adsorbing surfactants capable of providing steric stability are preferred. Higher levels of colloid stability may be obtained by chemically binding or partially binding hydrophilic stabilising groups such as polyethylene oxide groups to the surface of dispersed polymer(s) particles. Suitable surfactants and stabilising groups are described in "Non Ionic Surfactants-Physical Chemistry" (M J Schick, M Dekker Inc. 1987) and "Polymer Colloids" (Buscall, Corner & Stageman, Elsevier Applied Science Publishers 1985).

Chemical binding (grafting) of hydrophilic stabilising groups onto dispersed polymer(s) particles can be achieved by the use of a comonomer, polymerisation initiator and/or chain transfer agent bearing the stabilising group, for example methoxy(polyethylene oxide)$_{30}$ methacrylate may be introduced as a comonomer into an emulsion polymerisation to give rise to stabilised dispersed polymer particles with bound polyethylene oxide groups on the particle surface. Another method of producing a strongly sterically stabilised dispersed polymer(s) is to introduce cellulosic derivatives (e.g. hydroxy ethyl cellulose) during an emulsion polymerisation (see for example DH Craig, Journal of Coatings Technology 61, no. 779, 48, 1989). Hydrophilic stabilising groups may also be introduced into a preformed polymer before it is subsequently dispersed in water, as described in EP 0317258 where polyethylene oxide groups are reacted into a polyurethane polymer which is subsequently dispersed in water and then chain extended.

The combination of crosslinkable polyurethane oligomer(s) (and other crosslinkable or non-crosslinkable oligomers, if used) and dispersed polymer(s) is most conveniently prepared by physically blending the corresponding aqueous dispersions. However other methods of preparing the combination can sometimes be utilised. One such method is to prepare the crosslinkable polyurethane oligomer(s) in organic solvent solution as previously discussed, and to disperse this solution directly into an aqueous dispersed polymer(s). Alternatively the organic solvent can be removed from the crosslinkable polyurethane oligomer(s) solution, and the polyurethane oligomer(s) directly dispersed into an aqueous dispersed polymer(s). The dispersed polymer can also be added to an organic solvent solution of the polyurethane oligomer(s). Another method is to introduce the crosslinkable polyurethane oligomer(s) into an aqueous free radical polymerisation reaction which produces the dispersed polymer(s). Such an introduction of polyurethane oligomer(s) may be at the commencement of the aqueous free radical polymerisation and/or during the aqueous free radical polymerisation. (Also, as mentioned previously, a dispersed polymer can sometimes be formed in-situ from the synthesis of a polyurethane oligomer as a very high molecular weight polymer fraction resulting from the urethane synthesis).

The crosslinkable polyurethane oligomer(s) may also be diluted with reactive diluent (for example vinyl monomers) at any stage of its preparation and then dispersed in water optionally containing a dispersed polymer(s), followed by polymerisation of the reactive diluent in the presence of the polyurethane oligomer(s) and the optional dispersed polymer(s). Optionally, depending on the nature of the reactive diluent, no further polymerisation of the reactive diluent prior to use in a coating may be required.

Alternatively the crosslinkable polyurethane oligomer(s) and dispersed polymer(s) may be combined by preparing a redispersible dry powder form of the dispersed polymer(s), and then dispersing the redispersible dry powder directly into an aqueous dispersion of the crosslinkable polyurethane oligomer(s). Methods for preparing redispersible dry powders from polymer emulsions are described for example in U.S. Pat. No. 5,962,554, DE 3323804 and EP 0398576.

In an embodiment of the invention the crosslinkable polyurethane oligomer(s) and the dispersed polymer(s) are compatible in the drying aqueous composition. Preferably the crosslinkable polyurethane oligomer(s) and the dispersed polymer(s) give clear films upon film formation after coating of the aqueous composition onto a substrate.

Preferably the ratios by weight of solid material of crosslinkable polyurethane oligomer(s) (and other crosslinkable or non-crosslinkable oligomers, if used) to dispersed polymer(s) are in the range of from 100:0 to 10:90, more preferably in the range of from 90:10 to 20:80, still more preferably in the range of from 75:25 to 25:75, and especially in the range of from 65:35 to 35:65.

The aqueous coating compositions of the invention are particularly useful when in the form of final coating formulations (i.e. composition intended for application to a substrate without any further treatment or additions thereto) such as protective or decorative coating compositions (for example paint, lacquer or varnish) wherein an initially prepared composition may be further diluted with water and/or organic solvents and/or combined with further ingredients, or may be in more concentrated form by optional evaporation of water and/or organic components of the liquid medium of an initially prepared composition. The invention composition can contain a co-solvent or a mixture of co-solvents. More preferably the invention composition can contain co-solvent or a mixture of co-solvents in a concentration $\leq 18\%$, more preferably $\leq 10\%$, especially $\leq 5\%$, most preferably $\leq 3\%$ and most especially 0% by weight based on the invention composition.

Preferably the evaporation rate of the co-solvent is $\leq 0.6$, more preferably $\leq 0.15$, most preferably $\leq 0.08$ and especially $\leq 0.035$. Values for evaporation rates were published by Texaco Chemical Company in a bulletin Solvent Data: Solvent Properties (1990). (The values given are relative to the evaporation rate (ER) is defined as 1.00). Determination of evaporation rates of solvents that are not listed the Texaco bulletin is as described in ASTM D3539.

In a special embodiment, the amount of co-solvent(s) used in the invention composition is preferably linked to the Mw of the crosslinkable polyurethane oligomer(s) in the composition. For crosslinkable polyurethane oligomer(s) with Mw in the range 1,000 to 40,000 Daltons, the amount of co-solvent is preferably 0 to 15 wt. % based on the weight of the composition, more preferably 0 to 10 wt. %. For crosslinkable polyurethane oligomer(s) with Mw in the range >40,000 to 80,000 Daltons, the corresponding figures for the preferred amount of co-solvent are 0 to 25 wt. %, more preferably 5 to 20 wt. %.

Furthermore, there is also a preferred relationship between the amount of co-solvent used and the amount of binder polymer solids (oligomer plus dispersed polymer), viz the amount of co-solvent is preferably $\leq 50$ wt % based on the weight of binder polymer solids in the composition, more preferably $\leq 35$ wt %, more preferably $\leq 20$ wt %, more preferably $\leq 10$ wt %, and especially preferably 0 wt %.

An advantage of the present invention is that (if used) co-solvent can; if as is often required for environmental and safety reasons, be present at a very low concentrations because of the plasticising nature of the crosslinkable polyurethane oligomer(s). Preferably the co-solvent to water ratio is below 1.0, more preferably below 0.5, most preferably below 0.3 and especially below 0.15. The co-solvent(s) can all be added at the final formulation step. Alternatively some or all of the co-solvent in the final formulation can be the co-solvent utilised in the preparation of the crosslinkable polyurethane oligomer. An important consideration when choosing a co-solvent is whether or not the co-solvent is compatible with the crosslinkable polyurethane oligomer(s) and/or the dispersed polymer(s) and the effect of any co-solvent partitioning (and the partitioning of the co-solvent in the (aqueous) oligomer phase versus the dispersed polymer particles is preferably >1/1, more preferably >2/1 and most preferably >3/1). If the co-solvent is more compatible with the dispersed polymer it will swell the dispersed polymer, thus increasing the overall viscosity. Preferably any co-solvent present in the aqueous composition of the invention is more compatible with the polyurethane oligomer(s) then with the dispersed polymer(s), so that the dispersed polymer(s) undergoes little if any swelling by the co-solvent. The co-solvent selection is often determined by experimentation and/or by the use of a solubility parameter concept i.e. maximising the difference in the solubility parameter of the dispersed polymer(s) and solvent leads to a minimisation of the co-solvent uptake by the dispersed polymer(s). Solubility parameters of a range of solvents and a group contribution method for assessing the solubility parameters of polymers are given by E A Grulke in the "Polymer Handbook" (John Wiley pages 519-559, 1989) and by D W Van Krevelen and P J Hoftyzer in "Properties of Polymers. Correlations With Chemical Structure" (Elsevier, New York, 1972 chapters 6 and 8). Co-solvent uptake of the dispersed polymer(s) may also be decreased by increasing its Tg so that the dispersed polymer(s) is in the glassy region at ambient temperature, or by pre-crosslinking the dispersed polymer(s) as described above. Other ways of introducing pre-cross linking into dispersed polymer(s) are known in the art, for example U.S. Pat. No. 5,169,895 describes the preparation of pre-crosslinked polyurethane aqueous dispersions by the use of tri-functional isocyanates in the synthesis.

A known problem with many autoxidisable coating compositions is that the resultant coatings have a tendency to yellow, in particular where the autoxidisable groups are derived from polyunsaturated fatty acids, such as for example tung oil fatty acid, linolenic acid, eleostearic acid, arachidonic acid, clupanadonic acid, and fatty acids obtainable from dehydrated castor oil. This may be unacceptable depending on the desired colour of the resultant coating. Preferably the aqueous composition has a starting yellowness value of less than 10, more preferably less than 7 and most preferably less than 4, measured as described herein. Preferably the aqueous composition has an increase in yellowing in darkness of less than 7, more preferably less than 5, most preferably less than 3 and preferably the aqueous composition has an increase in yellowing in daylight of preferably less than 4, preferably less than 3 and more most preferably less than 2 as measured by the test method described herein. Furthermore, the absolute yellowness (i.e. yellowness at start plus yellowness due to ageing) of the aqueous composition is preferably less than 12, more preferably less than 10, still more preferably less than 8, and most preferably less than 6.

In a further embodiment of the present invention there is provides an aqueous coating composition as defined herein comprising:

i) 3 to 26% of a crosslinkable oligomer(s) by weight of the composition of which at least 52 wt % is a crosslinkable water-dispersible polyurethane oligomer(s);

ii) 0 to 6.5% of a non-crosslinkable oligomer(s) by weight of the composition;

iii) 10 to 56% of dispersed polymer(s) by weight of the composition;

iv) 0 to 15% of co-solvent by weight of the composition;

v) 5 to 65% of water by weight of the composition;

where i)+ii)+iii)+iv)+v)=100%.

In another embodiment of the present invention there is provided an aqueous coating composition as defined herein comprising:

i) 15 to 40% of a crosslinkable oligomer(s) by weight of crosslinkable oligomer(s), non-crosslinkable oligomer(s) and dispersed polymer(s) of which at least 52 wt % is a crosslinkable water-dispersible polyurethane oligomer(s);

ii) 0 to 10% of a non-crosslinkable oligomer(s) by weight of crosslinkable oligomer(s), non-crosslinkable oligomer(s) and dispersed polymer(s);

iii) 50 to 85% of dispersed polymer(s) by weight of crosslinkable oligomer(s), non-crosslinkable oligomer(s) and dispersed polymer(s);

where i)+ii)+iii)=100%.

The aqueous coating composition of the invention may be applied to a variety of substrates including wood, board, metals, stone, concrete, glass, cloth, leather, paper, plastics, foam and the like, by any conventional method including brushing, dipping, flow coating, spraying, and the like. They are, however, particularly useful for providing coatings on wood and board substrates. The aqueous carrier medium is removed by natural drying or accelerated drying (by applying heat) to form a coating.

Accordingly, in a further embodiment of the invention there is provided a coating obtainable from an aqueous coating composition of the present invention. The aqueous coating composition of the invention may contain other conventional ingredients, some of which have been mentioned above; examples include pigments, dyes, emulsifiers, surfactants, plasticisers, thickeners, heat stabilisers, levelling agents, anti-cratering agents, fillers, sedimentation inhibitors, UV absorbers, antioxidants, dispersants, flow agents, adhesion promoters, defoamers, co-solvents, wetting agents and the like introduced at any stage of the production process or subsequently. It is possible to include an amount of antimony oxide in the dispersions to enhance the fire retardant properties. Optionally external crosslinking agent(s) may be added to the aqueous composition of the invention to aid crosslinking during and after drying. Examples of reactive functional groups which may be utilised for external crosslinking agent(s) include but are not limited to hydroxyl functional groups reacting with isocyanate (optionally blocked), melamine, or glycouril functional groups; keto, aldehyde and/or acetoacetoxy carbonyl functional groups reacting with amine or hydrazine functional groups; carboxyl functional groups reacting with aziridine, epoxy or carbodiimide functional groups; silane functional groups reacting with silane functional groups; epoxy functional groups reacting with amine or mercaptane groups as well as carboxyl functional groups undergoing metal ion (such as zinc) crosslinking.

In particular, the aqueous coating compositions of the invention, if autoxidisable, advantageously include a drier salt(s). Drier salts are well known to the art for further improving curing in unsaturated film-forming substances. Generally speaking, drier salts are metallic soaps, that is salts of metals and long chain carboxylic acids. It is thought that the metallic ions effect the curing action in the film coating and the fatty acid components confer compatibility in the coating medium. Examples of drier metals are cobalt, manganese, zirconium, lead, neodymium, lanthanum and calcium. The level of drier salt(s) in the composition is typically that to provide an amount of metal(s) within the range of from 0.01 to 0.5% by weight based on the weight of autoxidisable polyurethane oligomer(s) and or autoxidisable dispersed polymer(s).

Drier salts are conventionally supplied as solutions in white spirit for use in solvent-borne alkyd systems. They may, however, be used quite satisfactorily in aqueous coating compositions since they can normally be dispersed in such systems fairly easily. The drier salt(s) may be incorporated into the aqueous coating composition at any convenient stage. For example the drier salt(s) may be added prior to dispersion into water. Drier accelerators may be added to the drier salts. Suitable drier accelerators include 2,2'-bipyridyl and 1,10-phenanthroline.

If desired the aqueous dispersion of the invention can be used in combination with other polymer dispersions or solutions which are not according to the invention.

BRIEF DESCRIPTION OF THE DRAWINGS

FIG. 1 shows the drying profile measured using a shear rate of $0.0997\ s^{-1}$.

FIG. 2 shows the drying profile measured using a shear rate of $0.990\ s^{-1}$.

FIG. 3 shows the drying profile measured using a shear rate of $9.97\ s^{-1}$.

FIG. 4 shows the drying profile measured using a shear rate of $78.6\ s^{-1}$.

Figure 1:
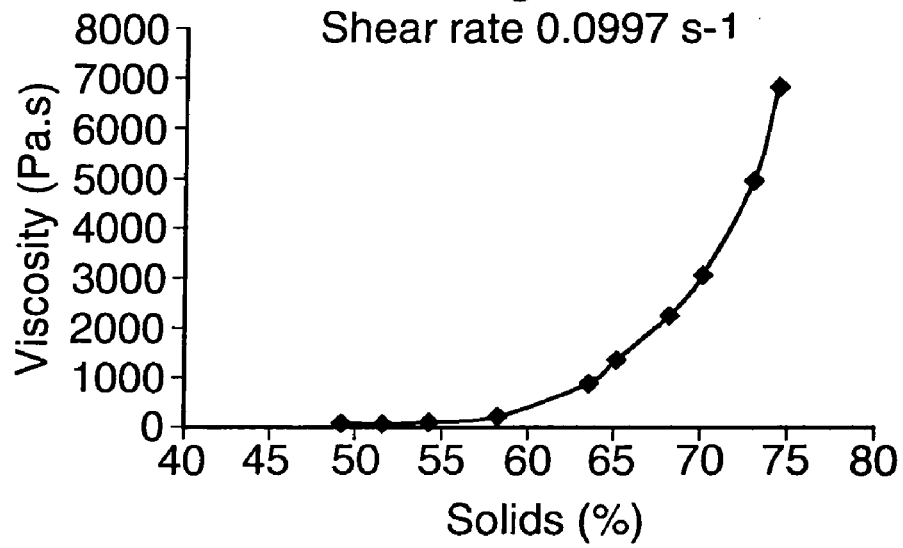
FIGS. 1 to 4 illustrate the drying profile of a composition according to the present invention [Example 9], where the equilibrium viscosity is measured as the solids content increases.

The present invention is now illustrated by reference to the following examples. Unless otherwise specified, all parts, percentages and ratios are on a weight basis. The term "working" means that the example is according to the invention. The term "non-working" means that it is not according to the invention (i.e. comparative).

Test Methods:

To test for the open time and wet edge time of the aqueous compositions prepared as described in the examples below, the aqueous composition was applied using a wire rod to a test chart (18×24 cm, form 8B-display, available from Leneta Company) at a wet film thickness of 120 μm. Open time and wet edge time tests were performed at fairly regular time intervals according to the approximate expected final times in each case (being determined roughly from a trial run), the intervals between measurements decreasing towards the end of the run. The measurements were carried out at relative humidity levels of 50+/−5%, temperatures of 23+/−2° C. and an air flow ≦0.1 m/s.

Open Time:

The open time was determined by brushing at regular time intervals (as mentioned above) a virgin 75 cm² area of the coated chart with a brush (Monoblock no 12, pure bristles/ polyester 5408-12) carrying some more of the composition with a brush pressure of 100-150 g during 30 seconds. In this time the brush was moved in one set comprising 5 times in the direction of the width of the substrate and 5 times in the direction of length of the substrate before visually assessing the coating. Once the composition carried on the brush no longer formed a homogeneous layer with the coating on the substrate the open time was considered to be over.

Wet Edge Time:

The wet edge time was determined by brushing at regular time intervals (as mentioned above) a virgin 25 cm² edge area of the coated chart with a brush (Monoblock no 12, pure bristles/polyester 5408-12) carrying some more of the composition with a brush pressure of 100-150 g during 30 seconds. In this time the brush was moved in one set comprising 5 times in the direction of the width of the substrate and 5 times in the direction of length of the substrate before visually assessing the coating. Once the composition carried on the brush no longer formed a homogeneous layer with the coating on the substrate and/or a visible lap line could be seen the wet edge time was considered to be over.

Drying Time:

To test the dust-free, tack-free and thumb-hard drying stages of the aqueous compositions prepared in the Examples as described below, the aqueous composition was applied to a glass plate at a wet film thickness of 80 μm. Drying time tests were performed at regular time intervals at relative humidity levels of 50+/−5%, temperatures of 23+/−2° C. and an air flow $\leq 0.1$ m/s.

Dust-Free Time:

The dust-free time was determined by dropping a piece of cotton wool (about 1 cm³ i.e. 0.1 g) onto the drying film from a distance of 25 cm. If the piece of cotton wool could be immediately blown from the substrate by a person without leaving any wool or marks in or on the film, the film was considered to be dust-free.

Tack-Free Time:

The tack-free time was determined by placing a piece of cotton wool (about 1 cm³, 0.1 g) on the drying film and placing a metal plate (with a diameter of 2 cm) and then a weight of 1 kg onto the piece of cotton wool (for 10 seconds). If the piece of cotton wool could be removed from the substrate by hand without leaving any wool or marks in or on the film, the film was considered to be tack-free.

Thumb-Hard Time:

The thumb-hard time was determined by placing the coated glass plate on a balance and a thumb was pressed on the substrate with a pressure of 7 kg. The thumb was then rotated 90° under this pressure. If the film was not damaged the coating was dried down to the substrate level and considered to be thumb-hard.

Sandability

Sandability corresponds to the hardness of a coating at the point when a coating can be sanded properly. The composition prepared in the Examples described below was applied to a piece of wood at a wet film thickness of 120 μm. The coating was abraded by hand with sandpaper (grain delicacy P150) at regular time intervals at relative humidity levels of 50+/−5%, temperatures of 23+/−2° C. and an air flow $\leq 0.1$ m/s. When there was no significant clogging (or the coating started powdering) the coating was considered to be sandable.

Water Resistance:

The compositions prepared in the examples below were cast down on Leneta test charts Form 2C with a film thickness of 120 μm. The films were dried at room temperature for 4 hours and at 50° C. for 16 hours. After they were cooled down to room temperature the films were tested for water resistance.

A few drops of water were placed on the films and covered with a watch glass. The water was removed after 16 hours at room temperature and the damage to the coating was assessed immediately and after four hours recovery. 0 Means that the coating is dissolved, 5 means that the coating is not affected at all.

Detergent Resistance:

The compositions prepared in the examples below were cast down on Leneta test charts Form 2C with a film thickness of 120 μm. The films were dried at room temperature for 4 hours and at 50° C. for 16 hours. After they were cooled down to room temperature the films were tested for detergent resistance.

A few drops of detergent were placed on the films and covered with a watch glass. The detergent was removed after 16 hours at room temperature and the damage to the coating was assessed immediately and after four hours recovery. 0 Means that the coating is dissolved, 5 means that the coating is not affected at all.

Viscosity:

All viscosity measurements were performed on a Bohlin Rheometer VOR or a TA Instruments AR1000N Rheometer, using the cup & spindle (C14), cone & plate (CP 5/30) and/or plate & plate (PP15) geometry, depending on the viscosity of the sample to be measured.

Solution Viscosity

For the solution viscosity measurements (both at 50±2° C. and at 23±2° C.), the cone & plate (CP 5/30) geometry was used and the measurements were performed at a shear rate of 92.5 s$^{-1}$. If the oligomer solutions were too low in viscosity to remain in between the cone and the plate, the Cup & Spindle C14 geometry was used and the viscosity measurements were performed at a shear rate of 91.9 s$^{-1}$. For both geometries, the gap between the Cone and the Plate (or between the Cup and the Spindle) was set to 0.1 mm, prior to each measurement. The solution viscosities of the oligomers were measured using the solvent systems and the conditions as defined herein in the statements of invention:

1. The 80% solids solution: The oligomer was diluted (if necessary) with the appropriate solvent to an 80% solids solution (in NMP, BG or a mixture of NMP and BG at any ratio) which was homogenised by stirring the solution for 15 minutes at 50±2° C.
2. The 70% solids solution: The oligomer was diluted with the appropriate solvent (or mixture of solvents) to result in a 70% solids solution (either in NMP/water/DMEA or in BG/water/DMEA, or in (a mixture of NMP and BG at any ratio)/water/DMEA; in both solvent mixtures the solvents should be present in a weight ratio of 20/7/3, respectively) which was homogenised by stirring the solution for 15 minutes at 50° C. The resulting solution was subsequently cooled prior to the viscosity measurement at 23±2° C.

A sample of oligomer solution was placed in the appropriate measurement geometry (Cone & Plate CP 5/30 or Cup & Spindle C14 geometry). The solution viscosity of the oligomer was measured at a temperature of 50±2° C. for the 80% solids oligomer solution, and at ambient temperature for the 70% solids oligomer solution. A heating/cooling unit in the measurement geometry was used to control the temperatures.

Equilibrium Viscosity

The equilibrium viscosity measurements were performed with the plate & plate geometry, with a 15 mm (P15) top-plate and a 30 mm (P30) bottom-plate. The gap between the two plates was set to 1.0 mm. All compositions were used at the solids level at which they were prepared and not diluted to lower solids levels.

Step 1: Three test charts were provided with coatings of identical film thickness. The coatings were applied with a 120 µm wire rod and the actual film thickness (and its uniformity) was checked with a wet film gauge, 20-370 µm, of Braive Instruments. The charts were dried under identical conditions in an environment where the airflow was <0.1 m/s.

Step 2: One test chart was used to determine the solids increase in time. The weight of the film was monitored in time, starting right after application of the film. After calculating the solids content at every measurement, a solids-time curve could be constructed and a trend line was calculated for the solids of the film as a function of the drying time.

Step 3: The other two test charts were used to determine the equilibrium viscosity in time: approximately every 5 minutes a sample was scraped from one test chart (in random order) and the viscosity of this sample was measured at 23° C. at representative shear rates of $0.0997\ s^{-1}$, $0.990\ s^{-1}$, $9.97\ s^{-1}$ and $78.6\ s^{-1}$. The measurements were continued for 90 minutes, unless reproducible sampling from the test charts could not be performed properly within that period of time (due to for example drying of the film to reach the dust free time).

Figure 2:
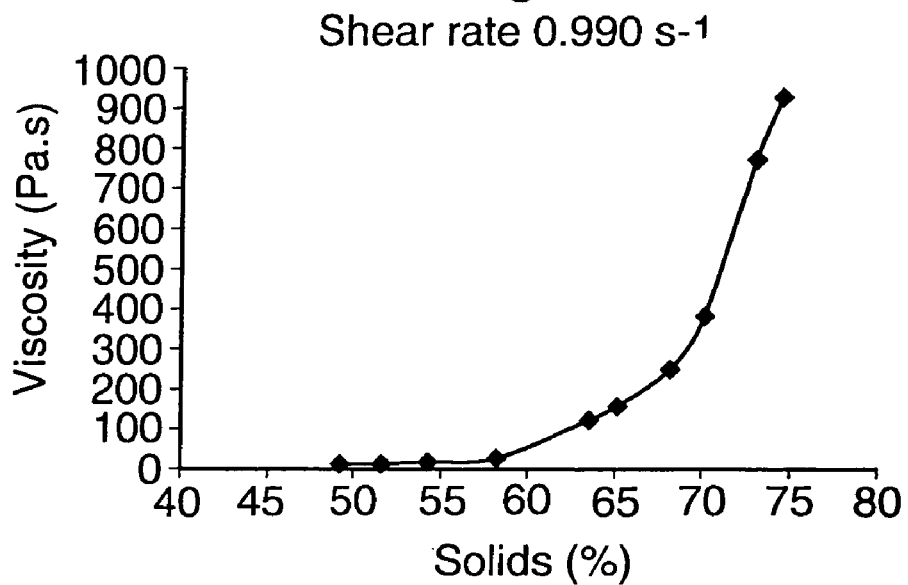
Figure 3:
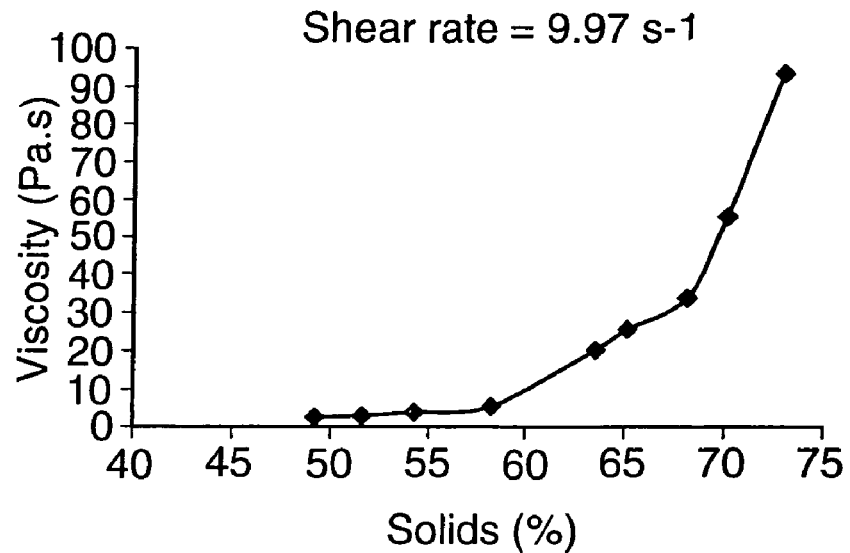
Figure 4:
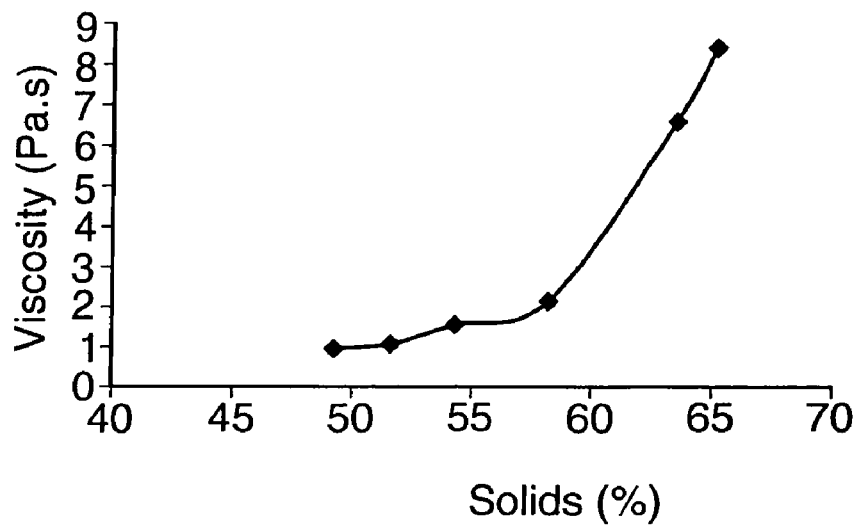

Step 4: The final drying curve of the coating as shown in FIGS. 1 to 4 (in which the equilibrium viscosity is represented as a function of the solids of the drying film) could be constructed from the solids-time curve (Step 2) and the equilibrium viscosity data (Step 3). If the equilibrium viscosity at a shear rate of $9.97\ s^{-1}$ is lower than the equilibrium viscosity at a shear rate of $0.99\ s^{-1}$, which in turn is lower than the equilibrium viscosity at a shear rate of $0.0997\ s^{-1}$, the composition may be regarded as shear thinning. If this was the case then the equilibrium viscosity at $79.6\ s^{-1}$ was not always measured as it would inherently always be lower than the equilibrium viscosity at a shear rate of $9.97\ s^{-1}$.

Measurement of Film Yellowing:

The yellowness of a fresh coating and the increased yellowing of a coating exposed to daylight or darkness for a specified time period was determined using a Tristimulus Colorimeter consisting of a data-station, a micro-colour meter, a calibration plate with a defined x, y and z value and a printer. The equipment was calibrated to the defined values of the calibration plate and then colour co-ordinates L, a and b, were measured. The colour co-ordinates define the brightness and colour on a colour scale, where 'a' is a measure of redness (+a) or greenness (−a) and 'b' is a measure of yellowness (+b) or blueness (−b), (the more yellow the coating, the higher the 'b' value). The co-ordinates 'a' and 'b' approach zero for neutral colours (white, grays and blacks). The higher the values for 'a' and 'b' are, the more saturated a colour is. The lightness 'L' is measured on a scale from 0 (white) to 100 (black).

Yellowing in daylight is defined as the increase of the yellowness (day Δb) of the coating during storage at 23±2° C. and in daylight for 28 days. The yellowing in the dark is defined as the increase in the yellowness (dark Δb) of the coating during storage at 23±2° C. and in the dark for 14 days.

Molecular Weight Determination

Gel permeation chromatography (GPC) analyses for the determination of polymer molecular weights were performed on an Alliance Waters 2690 GPC with two consecutive PL-gel columns (type Mixed-C, l/d=300/7.5 mm) using tetrahydrofuran (THF) as the eluent at 1 $cm^3$/min and using an Alliance Waters 2410 refractive index detector. Samples corresponding to about 16 mg of solid material were dissolved in 8 $cm^3$ of THF, and the mixtures were stirred until the samples had dissolved. The samples were left undisturbed for at least 24 hours for complete "uncoiling" and subsequently were filtered (Gelman Acrodisc 13 or 25 mm ø CR PTFE; 0.45 µm) and placed on the auto-sampling unit of the GPC. A set of polystyrene standards (analysed according to DIN 55672) was used to calibrate the GPC.

All species with a molecular weight less than 1000 Daltons are ignored when calculating the Mw and PDi for the oligomers. When Daltons are used in this application to give molecular weight data, it should be understood that this is not a true molecular weight, but a molecular weight measured against polystyrene standards as described above.

MATERIALS & ABBREVIATIONS USED

DEA=N,N-diethylethanolamine
Cardura E10=Neodecanoic acid-2,3-epoxypropyl ester available from Shell
MPEG750=methoxypolyethylene glycol (Mn approximately 750)
DMPA=dimethylolpropionic acid
NMP=N-methylpyrrolidone
TDI=toluene diisocyanate
Dowanol DPM=dipropylene glycol monomethyl ether
DAPRO5005=drier salt available from Profiltra
1,4-CHDM=1,4-cyclohexanedimethanol
Voranol P-400=polypropyleneglycol available from DOW Chemical
A1310=NCO functional silane component available from CK Witco Corporation
DMBA=dibutylbutanoic acid
TMPME=trimethylolpropanemonoallyl ether
TMPDE=trimethylpropanediallylether
IPDI=isophorone diisocyanate
TEA=triethylamine
Combi LS=drier salt available from Servo Delden
Boltorn H20=Dendritic polymer available from Perstorp
Nouracid LE80=linseed oil fatty acid available from AKZO Nobel
Fastcat 2005=tin(II) chloride available from Elf-Atochem
MEK=methyl ethyl ketone
Atlas 4809=Alkyl phenol alkoxylate available from ATLAS Chemie
Atpol E5720/20=Fatty alcohol ethoxylate available from Uniqema
AP=ammonium persulphate
Aerosol OT-75=Sodium dioctylsulphosuccinate available from Cytec
MMA=methylmethacrylate
n-BA=n-butylacrylate
AA=acrylic acid
SLS=Sodium Lauryl Sulphate
Akyposal NAF=Sodium dodecylbenzenesulphonate available from KAO Chemicals Natrosol 250LR=Hydroxy ethyl cellulose available from Hercules
Akyporox OP-250V=Octyl phenol ethoxylate available from KAO Chemicals
Surfactant=Phosphate ester of nonyl phenol ethoxylate available from KAO Chemicals
VeoVa 10=Vinyl ester of versatic acid available from Shell
Desmodur W=dicyclohexyl methane diisocyanate available from Bayer
Priplast 3192=Dimeric acid polyester polyol available from Uniqema
BMA=n-butyl methacrylate
t-BHPO=t-butyl hydroperoxide
$Fe^{III}$.EDTA=ferric ethylene diamine tetracetic acid
IAA=isoascorbic acid solution
STY=Styrene
2-EHA=2-Ethylhexylacrylate
Dynasilan MEMO=3-Methacryloxypropyltrimethoxysilane available from Degussa
HEMA=Hydroxyethylmethacrylate
TEGDMA=Triethyleneglycoldimethacrylate
OMKT=n-octyl mercaptane
TAPEH=tert-amylperoxy-2-ethyl hexanoate
Water=demineralised water
PW602=Transparent red iron-oxide pigment dispersion available from Johnson Matthey
AMP-95=2-amino-2-methyl-1-propanol (available from Intergrated Chemicals bv)
Delydran 1293=Defoamer additive (available from Cognis, 10% in BG)
Sufynol 104E=Welting agent (available from Air Products, 50% in EG)
NeoCryl BT-24=Acrylic emulsion polymer (available from NeoResins, Avecia bv)

Preparation of an Alkyd Polyol Mixture X1

A 2-L round bottom flask, equipped with a stirrer and a thermometer, was loaded with DEA; (247.56 g) and NaOMe (2.54 g). The mixture was heated to 100° C. until the NaOMe was dissolved. Then sunflower oil (1248.08 g) was added giving a hazy reaction mixture. Stirring the hazy reaction mixture at 100 to 110° C. was continued until a clear reaction mixture was obtained and a DEA-conversion of at least 85% was achieved, as determined by titration of residual amine functionality in the product with aqueous HCl. The resulting mixture was then cooled to 70° C. before adding $H_3PO_4$ (1.81 g) and stirring for 15 minutes. The product mixture (X1) was cooled to room temperature and stored under nitrogen. The DEA conversion was 94%.

Preparation of Polyols X2 to X6:

The compositional details and the OH-values are given in Table 1 below.

Preparation of an Alkyd Polyol Mixture X2

Alkyd polyol X2 was prepared according to the same procedure as alkyd polyol X1 with the difference that the sunflower oil was replaced by tung oil.

Preparation of an Alkyd Polyol Mixture X3

The alkyd polyol X3 was prepared according to the same procedure as alkyd polyol mixture X1 with a different DEA/oil (mol/mol) ratio, 1.70 instead of 1.60.

Preparation of Polyol X4

A 2-L reactor, equipped with a stirrer and a thermometer, was loaded with Cardura E10 (1016.5 g), levulinic acid (483.4 g) and dimethylbenzylamine (4.5 g) in a nitrogen atmosphere. The temperature was raised to 140° C. and the mixture was stirred for 16 hours until an acid value of 1.2 was obtained. The product was cooled to room temperature and stored under nitrogen. The resulting OH value was 167.5 mgKOH/g.

Preparation of an Poly-Alkoxylated Adduct X5

A 2-L 3-necked round bottom flask, equipped with stirrer, was loaded with methoxypolyethylene glycol (MPEG750; 1323.53 g) and succinic anhydride (176.47 g) in a nitrogen atmosphere. The reaction mixture was heated to 120° C., and was stirred at this temperature until all the anhydride had reacted, as judged from the Infra Red spectrum of the reaction mixture (the anhydride groups typically show two absorptions at 1785 $cm^{-1}$ and 1865 $cm^{-1}$, which disappeared and were replaced by a new ester carbonyl absorption at 1740 $cm^{-1}$). The clear liquid product was then cooled to 50° C. and collected. The product solidified when left undisturbed at ambient temperature. The resulting acid value was 68.7 mgKOK/g and the resulting OH value was 100.0 mgKOH/g.

Preparation of an Alkyd Polyol Mixture X6

A 2-L 5-necked reactor flask fitted with a stirrer, a thermometer and a condenser fitted with a Dean-Stark condensate trap, was loaded with Pentaerythritol (218.10 g), the levulinic acid (118.4 g), Prifac 8961-0 (841.50 g) and Fastcat 2005 (0.50 g) in a nitrogen atmosphere. The reaction mixture was heated to 210° C. for approximately 6 hours, until an acid value of less than 1 mg KOH/g was obtained. The product was cooled to room temperature and stored under nitrogen.

TABLE 1

| Composition (g) | X1 | X2 | X3 |
| --- | --- | --- | --- |
| DEA | 247.56 | 939.39 | 287.3 |
| NaOMe | 2.54 | 9.3 | 3.54 |
| Tung oil | — | 4739.88 | — |
| Sunflower oil | 1248.08 | — | 1406.6 |
| $H_3PO_4$ | 1.81 | 6.60 | 2.53 |
| OH-value (mg KOH/g) | 264 | 264 | 270.5 |
| DEA conversion | 94% | 92% | 91% |

Preparation of Self-Crosslinkable (Autoxidisable) Urethane Oligomer A1, and its Dispersion DA1

A 1-L 3-necked round bottom flask, equipped with a stirrer and a thermometer, was loaded with DMPA (19.36 g), NMP (92.5 g), 1,4-CHDM (8.97 g), MPEG750 (18.87 g) and the alkyd polyol mixture X1 (260.43 g) in a nitrogen atmosphere. The reaction mixture was stirred until a clear solution was obtained. At a maximum temperature of 25° C. TDI (99.89 g) was fed into this reaction mixture without exceeding a reactor temperature of 50° C. After the TDI-feed was complete, the reaction mixture was heated to 80° C. and stirred at this temperature for 1 hour. The resultant NCO free alkyd urethane oligomer was then cooled to about 70° C., and diluted with Dowanol DPM (51.38 g). Subsequently DMEA (10.27 g) followed by the drier salt DAPRO5005 (5.84 g) was added and the mixture was stirred for 15 minutes. Then water (155.43 g) was added and the temperature was lowered to 55-60° C. The resultant predispersion was stirred for an additional 15 minutes.

Part of the resultant predispersion (600 g), at 55 to 60° C., was dispersed in water (752.889; 45-50° C.), over 60 minutes and under a nitrogen atmosphere. While the predispersion is being dispersed, the temperature of the water phase was 45 to 50° C. After the addition was complete, the final dispersion was stirred for an additional 15 minutes, cooled to 23° C., filtered over a 200-mesh sieve and stored under nitrogen. The dispersion DA1 had a solids content of 25 wt % and a pH of 6.9.

The solution viscosity of a 80% solids solution of A1 in NMP (50° C., shear rate 92.5 s$^{-1}$) is 10.9 Pa·s.

The solution viscosity of a 70% solids solution of A1 in NMP/H$_2$O/DMEA (2017/3) (23° C., shear rate 92.5 s$^{-1}$) is 6.6 Pa·s.

GPC analysis of A1: Mw=4917; PDi=1.94

Preparation of Self-Crosslinkable (Schiff-Base) Urethane Oligomer A2 and its Dispersion DA2

A 1-L 3-necked round bottom flask, equipped with a stirrer and a thermometer, was loaded with DMPA (26.40 g), NMP (120.00 g), Voranol P-400 (198.01 g) and MPEG750 (22.22 g) in a nitrogen atmosphere. The reaction mixture was stirred until a clear solution was obtained. The polyol mixture was fed to TDI (233.38 g) without exceeding a reactor temperature of 55° C. After the polyol-feed was complete, the reaction mixture was heated to 80° C. and stirred at this temperature for 1 hour. The NCO content of the obtained prepolymer was checked and was found to be 8.94%. Subsequently the urethane prepolymer is capped with the polyol X4 (429.00 g). The temperature was raised to 100° C. The reaction mixture was kept at this temperature for 6.5 hours. Part of the resultant NCO free urethane oligomer (A2) (842.92 g) was cooled to 70° C., and diluted with Dowanol DPM (95.59 g) and NMP (87.87 g). Then DMEA (14.37 g) was added, and the resultant mixture was stirred for an additional 15 minutes and cooled to 50° C. Part of the resultant mixture (600 g) was dispersed into water (831.00 g; 45 to 50° C.) under a nitrogen atmosphere, over 60 minutes. Then the final dispersion was stirred for an additional 15 minutes at 45 to 50° C., cooled to 23° C., filtered over a 200-mesh sieve and stored under nitrogen.

The dispersion DA2 has a solids content of 29.6 wt % and a pH of 7.03.

The solution viscosity of an 80% solids solution of A2 in NMP (50° C., shear rate 92.5 s$^{-1}$) was 30.0 Pa·s. The solution viscosity of a 70% solids solution of A2 in NMP/H$_2$O/DMEA (20/7/3) (23° C., shear rate 92.5 s$^{-1}$) was 4.6 Pa·s.

GPC analysis of A2: Mw=3334; PDi=1.48.

Preparation of Self-Crosslinkable (Silane) Urethane Oligomer a3 and its Dispersion DA3

A 1-L 3-necked round bottom flask, equipped with a stirrer and a thermometer, was loaded with DMPA (38.40 g), NMP (120.00 g), Voranol P-400 (285.38 g) and MPEG750 (22.22 g) in a nitrogen atmosphere. The reaction mixture was stirred until a clear solution was obtained. At a maximum temperature of 25° C., TDI (134.00 g) was fed into this polyol mixture without exceeding a reactor temperature of 50° C. After the TDI-feed was complete, the reaction mixture was heated to 80° C. and stirred at this temperature for 1 hour. The resultant NCO free polymer was then capped with A1310 (99.889), and diluted with NMP (25.00 g). Subsequently tin octoate (0.35 g) was added and the reactor temperature was raised to 90 to 95° C. The reaction mixture was kept at this temperature for about 4 hours before cooling to 55 to 60° C. Part of the resultant silane functional urethane oligomer (563.10 g) was then diluted with Dowanol DPM (57.80 g), neutralised with DMEA (19.80 g), homogenised for 15 minutes, and subsequently fed into water (860.62 g) in a separate reactor under a nitrogen atmosphere. The resultant dispersion was cooled to 23° C., filtered over a 200-mesh sieve and stored under nitrogen.

The dispersion DA3 had a solids content of 29.2% and a pH of 7.50.

The solution viscosity of an 80% solids solution of A3 in NMP (50° C., shear rate 92.5 s$^{-1}$) was 37.0 Pa·s. The solution viscosity of a 70% solids solution of A3 in NMP/H$_2$O/DMEA (20/7/3) (23° C., shear rate 92.5 s$^{-1}$) was 15.0 Pa·s. GPC analysis of A3: Mw=15401; PDi=2.40.

Preparation of Self-Crosslinkable (Autoxidisable) Urethane Oligomer A4, and its Dispersion DA4

A 2-L 3-necked round bottom flask, equipped with a stirrer and a thermometer, was loaded with DMBA (48.00 g), NMP (240.00 g), TMPME (48.00 g), TMPDE (48.00 g), the alkydpolyol mixture X1 (497.10 g) and IPDI (318.90 g) in a nitrogen atmosphere. The reaction mixture was slowly heated to 50° C. The tin octoate (0.40 g) was added and the reaction mixture was slowly heated until a reaction temperature of 90° C. is reached. This temperature was maintained for 4.5 hours. The resultant urethane oligomer A4 was cooled to 70° C. A part of the oligomer (949.90 g) was diluted with Dowanol DPM (97.61 g), neutralised with triethylamine (TEA; 26.26 g) and subsequently Combi LS (47.50 g), followed by water (295.28 g), was added and homogenised for approximately 15 minutes at 60° C. NMP (395.4 g) was added to the resultant predispersion to reduce the viscosity and homogenised further for 15 minutes at 60° C. Part of the urethane predispersion (1100.00 g) was fed into water (889.3 g; 45 to 50° C.), in a separate reactor in a nitrogen atmosphere, homogenised for an additional 15 minutes, cooled to 23° C., filtered over a 200-mesh sieve, and stored in a nitrogen atmosphere. The resultant dispersion (DA4) had a solids content of 23.9% and a pH of 8.00.

The solution viscosity of an 80% solids solution of A4 in NMP (50° C., shear rate 92.5 s$^{-1}$) was 14.0 Pa·s. The solution viscosity of a 70% solids solution of A4 in NMP/H$_2$O/DMEA (20/7/3) (23° C., shear rate 92.5 s$^{-1}$) was 7.8 Pa·s.

GPC analysis of A4: Mw=4290; PDi=2.03.

Preparation of Self-Crosslinkable (Autoxidisable) Urethane Oligomer A5, and its Dispersion DA5

The alkyd urethane oligomer A5 and its dispersion DA5 were made according to the same procedure as alkyd urethane oligomer A1 and its dispersion DA1 except that alkyd polyol mixture X1 was replaced by alkyd mixture X2 and Voranol P400. The oligomer details are listed in Table 2. The dispersion details are listed in Table 3.

Preparation of Self-Crosslinkable (Autoxidisable) Urethane Oligomer A6, and its Dispersion DA6

The alkyd urethane oligomer A6, and its dispersion were made according to the same procedure as alkyd urethane A1 and its dispersion DA1 except that alkyd polyol mixture X1 was replaced by alkyd polyol mixture X3. The oligomer details are listed in Table 2. The dispersion details are listed in Table 3.

Preparation of Self-Crosslinking (Autoxidisable) Hyperbranched Polyester A7, and its Dispersion DA7

A 2-L 5-necked reactor flask fitted with a stirrer, a thermometer and a condenser fitted with a Dean-Stark condensate trap, was loaded with Boltorn H20 (150.00 g), adduct X5 (283.01 g) Nouracid (279.68 g) and Fastcat 2005 (0.18 g) in a nitrogen atmosphere. The reaction mixture was heated to 230° C. and water was collected. The mixture was kept at 230° C. until an acid value of less than 10 mg KOH/g was obtained.

A portion of the resultant hyperbranched polyester A7 (250.00 g) was heated to 60° C. and diluted with NMP (62.50 g), Dowanol DPM (31.25 g) and finally Dapro 5005 (6.25 g) was added before dispersion by the addition of water (50° C., 312.57 g) over a period of 10 minutes. The resulting dispersion DA7 was stirred for an additional 30 minutes at 50° C. and subsequently cooled to 23° C. and stored in a nitrogen atmosphere.

The dispersion DA7, had a solids content of 37.85% and a pH of 7.03.

The solution viscosity of an 80% solids solution of A7 in NMP (50° C., shear rate 91.9 s$^{-1}$) was 0.4 Pa·s. The solution viscosity of a 70% solids solution of A7 in NMP/H$_2$O/DMEA (20/7/3) (23° C., shear rate 91.9 s$^{-1}$) was 1.7 Pa·s. GPC analysis of A7: Mw=19683; PDi=6.21.

Preparation of Self-Crosslinkable (Autoxidisable) Urethane Oligomer A8, and its Dispersion DA8

The urethane oligomer A8 and its dispersion DA8 were made according to the same procedure as alkyd urethane A1 and its dispersion DA1 except that a part of the alkyd polyol mixture X1 was replaced by the alkyd polyol mixture X2. The oligomer details are listed in Table 2. The dispersion details are listed in Table 3.

Preparation of the Non-Crosslinkable Urethane Oligomer A9, and its Dispersion DA9

The alkyd urethane oligomer A9 and its dispersion DA9 were made according to the same procedure as alkyd urethane A1 and its dispersion DA1 except that the alkyd polyol mixture X1 was replaced by Voranol P-400. The oligomer details are listed in Table 2. The dispersion details are listed in Table 3.

Preparation of a Self-Crosslinkable (Autoxidisable) Urethane Oligomer A10 and its Dispersion DA10

The alkyd urethane oligomer A10 and its dispersion DA10 were made according to the same procedure as alkyd urethane A1 and its dispersion DA1 except that alkyd polyol mixture X1 was replaced by the alkyd polyol mixture X3, and the MPEG750 was removed. The oligomer details are listed in Table 2. The dispersion details are listed in Table 3.

Preparation of a Self-Crosslinkable (Autoxidisable) Urethane Oligomer A11 and its Dispersion DA11

A 1-L 3-necked round bottom flask, equipped with a stirrer and a thermometer, was loaded with DMPA (23.23 g), NMP (122.25 g), 1,4-CHDM (66.34 g), MPEG750 (22.64 g) and the alkyd polyol mixture X6 (25455 g) in a nitrogen atmosphere. The reaction mixture was stirred until a clear solution was obtained. At a maximum temperature of 25° C. TDI (122.25 g) was fed into this reaction mixture without exceeding a reactor temperature of 50° C. After the TDI-feed was complete, the reaction mixture was heated to 80° C. and stirred at this temperature for 1 hour. An extra amount of NMP (40.75 g), and the resultant alkyd urethane oligomer was then cooled to about 70° C., and further diluted with Dowanol DPM (9.66 g). Subsequently DMEA (12.34 g) followed by the drier salt DAPRO5005 (7.00 g) was added and the mixture was stirred for 15 minutes. Then water (186.51 g) was added and the temperature was lowered to 55-60° C. The resultant dispersion DA11 was stirred for an additional 15 minutes, and stored under nitrogen.

The solution viscosity of a 80% solids solution of A11 in NMP (50° C., shear rate 92.5 s$^{-1}$) is 17 Pa·s.

The solution viscosity of a 70% solids solution of A11 in NMP/H$_2$O/DMEA (2017/3) (23° C., shear rate 92.5 s$^{-1}$) is 21 Pa·s.

GPC analysis of A11: Mw=6954; PDi=2.48

Preparation of a Self-Crosslinkable (Autoxidisable) Urethane Oligomer A12 and its Dispersion DA12

A 2-L 3-necked round bottom flask, equipped with a stirrer and a thermometer, was loaded with DMBA (33.00 g), MPEG750 (27.78 g), the alkyd polyol mixture X1 (406.16 g), Tinoctoate (0.12 g) and IPDI (133.06 g) in a nitrogen atmosphere. The reaction mixture was heated until a reactor temperature of 100° C. was obtained. This temperature was maintained for 2 hours until no NCO was left. The resultant alkyd urethane oligomer was then cooled to about 70° C. Subsequently TEA (17.28 g) followed by the drier salt DAPRO5005 (9.95 g), Combi LS (13.77 g) and ATLAS G5000 (36.48 g) was added, and the mixture was stirred for 15 minutes. Finally water (1296.34 g) was added to the prepolymer. The resultant urethane dispersion had a solids content of 32.7% and a pH of 7.6.

The solution viscosity of a 80% solids solution of A12 in NMP (50° C., shear rate 92.5 s$^{-1}$) is 0.53 Pa·s.

The solution viscosity of a 70% solids solution of A12 in NMP/H$_2$O/DMEA (2017/3) (23° C., shear rate 92.5 s$^{-1}$) is 0.36 Pa·s.

GPC analysis of A13: Mw=1971; PDi=2.40.

TABLE 2

| Components (g) | A5 | A6 | A8 | A9 | A10 |
|---|---|---|---|---|---|
| TDI | 243.86 | 76.58 | 119.87 | 274.46 | 363.50 |
| DMPA | 105.60 | 23.23 | 23.23 | 48.00 | 60.00 |
| 1,4-CHDM | 0.00 | 10.76 | 10.76 | 0.00 | — |
| MPEG750 | 44.45 | 22.64 | 22.64 | 19.20 | — |
| Voranol P-400 | 362.09 | — | — | 618.64 | — |
| alkyd polyol X1 | — | — | 156.25 | — | — |
| alkyd polyol X2 | 204.00 | — | 156.25 | — | — |
| Alkyd polyol X3 | — | 355.79 | — | — | 716.50 |
| NMP | 240.00 | 111.00 | 111.00 | 240.00 | 300.00 |
| Solution Viscosity* | 23.0 | 0.5 | 24.0 | 57.0 | 255.0 |
| Solution Viscosity** | 12.5 | 0.9 | 10.2 | 36.7 | 343.4 |
| Mw | 5383 | 1948 | 5379 | 10251 | 172866 |
| PDi | 2.18 | 1.43 | 2.27 | 2.29 | 32.54 |

*80% solids in NMP at 92.5 s$^{-1}$ and 50° C. (Pa · s)
**70% solids in NMP/H$_2$O/DMEA at 92.5 s$^{-1}$ and 23° C. (Pa · s)

TABLE 3

| Composition | DA5 | DA6 | DA8 | DA9 | DA10 |
|---|---|---|---|---|---|
| Oligomer code | A5 | A6 | A8 | A9 | A10 |
| Oligomer (g) | 900.00 | 600.00 | 600.00 | 949.80 | 1440.00 |
| DPM (g) | 92.48 | 61.66 | 61.72 | 97.60 | 150.00 |
| DAPRO5005 (g) | 10.50 | 7.00 | 7.01 | 11.08 | 16.80 |
| DMEA (g) | 42.09 | 12.36 | 12.35 | 25.51 | 31.88 |
| water (predispersion) (g) | 279.99 | 186.51 | 186.71 | 295.25 | 446.70 |
| predispersion that is dispersed (g) | 1100.00 | 600.00 | 650.00 | 1100.00 | 915.00 |
| water (g) | 896.50 | 629.89 | 462.29 | 919.97 | 1575.58 |
| dispersion solids (%) | 28.80 | 24.77 | 33.00 | 29.94 | 20.08 |
| pH | 6.20 | 6.10 | 7.10 | 7.70 | 7.70 |

Preparation of Dispersed Vinyl Polymer P1

A 2-L 3-necked round bottom glass reactor, equipped with stirrer, thermometer and vortex breakers, was loaded with demineralised water (652.57 g), Atpol E5720/20 (4.99 g) and Borax.10H$_2$O (3.57 g) in a nitrogen atmosphere. The mixture was heated whilst stirring to 80° C. and then a solution of AP (2.31 g) in demineralised water (16.00 g) was added. In a dropping funnel a pre-emulsion was prepared by stirring a mixture of demineralised water (161.87 g), Atpol E5720/20 (94.85 g), Aerosol OT-75 (7.20 g), Borax.10H$_2$O (1.07 g), MMA (534.18 g), n-BA (444.32 g) and AA (19.97 g). 5% of this pre-emulsion was added to the reactor at 80°

C. over 5 minutes. The remainder was fed into the reactor over 160 minutes at 85° C. A solution of AP (0.53 g) in demineralised water (7.88 g) was added to the reactor during the first 15 minutes of feeding the pre-emulsified feed. Then the reactor content was kept at 85° C. for 30 minutes, and then cooled to 23° C. The pH was adjusted to 8 to 8.5 with 12.5% aqueous ammonia. The resultant dispersed product (P1) was filtered and collected.

The properties of P1 are listed in Table 5.

Preparation of a Sequential Dispersed Vinyl Polymer P2

A 2-L 3-necked round bottom glass reactor, equipped with stirrer, thermometer and vortex breakers, was loaded with demineralised water (990.94 g), SLS (30%, 0.55 g) and NaHCO$_3$, (4.44 g) in a nitrogen atmosphere. The mixture was heated whilst stirring to 80° C. and then a solution of AP (0.89 g) in demineralised water (5.00 g) was added. In a dropping funnel a monomer mixture was prepared by stirring MMA (140.48 g), n-BA (207.71 g) and AA (7.11 g). 10% of this mixture was added to the reactor at 80° C. The remainder was fed into the reactor over a period of 40 minutes at 85° C. The content of a separate dropping funnel, containing demineralised water (20.00 g), AP (0.36 g) and SLS 30% (11.62 g) was added in the same time. The reactor content was kept at 85° C. for 30 minutes. A second monomer mixture was prepared in a dropping funnel consisting MMA (464.91 g), n-BA (57.37 g) and AA (10.66 g). The mixture was fed to the reactor after the 30 minutes period in 60 minutes. The content of a separate dropping funnel, containing demineralised water (30.00 g), AP (0.53 g) and SLS 30% (17.44 g) was added in the same time. The reactor content was kept at 85° C. for 45 minutes and then cooled to 23° C. The pH was adjusted to 8 to 8.5 with 12.5% aqueous ammonia. The resultant product P2 was filtered and collected.

The properties of P2 are listed in Table 5.

Preparation of Dispersed Vinyl Polymer P3

A 2-L 3-necked round bottom glass reactor, equipped with stirrer, thermometer and vortex breakers, was loaded with demineralised water (194.50 g), Akyposal NAF (3.00 g), Borax.10H$_2$O (1.25 g), Acetic acid (0.50 g) and Natrosol 250LR (10.00 g) in a nitrogen atmosphere. The mixture was heated whilst stirring to 60° C. and then a solution of AP (0.50 g) in demineralised water (10.00 g) was added. In a dropping funnel a pre-emulsion was prepared by stirring with demineralised water (171.71 g), Akyposal NAF (3.00), Borax.10H$_2$O (1.25 g), Acetic acid (0.50 g) and Akyporox OP-250V (14.29 g) followed by VeoVa 10 (125.00 g) and vinyl acetate (375.00 g). 10% of this mixture was added to the reactor at 60° C. The mixture was heated whilst stirring to 80° C. The remainder was fed into the reactor over 90 minutes at 80° C. The content of a separate dropping funnel, containing a solution of AP (1.15 g) in demineralised water (60.00 g), was added in the same time. Then the reactor content was kept at this temperature for 120 minutes and then cooled to 23° C. The pH was adjusted to 8 to 8.5 with 12.5% aqueous ammonia. The resultant product P3 was filtered and collected.

The properties of P3 are listed in Table 5.

Preparation of the Dispersed Urethane Acrylic Polymer P4

Stage 1: A 1-L 3-necked round bottom flask, equipped with a stirrer and a thermometer, was loaded with NMP (100.00 g), DMPA (24.00 g), Desmodur W (152.68 g) and Priplast 3192 (223.33 g) in a nitrogen atmosphere. The reaction mixture was heated to 55° C., tin octoate (0.05) was added and the temperature was raised to 90-95° C. The mixture was kept at this temperature for 1 hour before adding tinoctoate (0.05) and the mixture was kept at 90° C. for an additional hour. The NCO-concentration of the mixture was found to be 4.83%. The resulting NCO terminated urethane prepolymer (500.05 g) (from which samples of a total weight of 10.0 grams were taken for % NCO-determination, leaving 490.05 grams of prepolymer) was then cooled to 70° C., neutralised with TEA (17.75 g) diluted with BMA (196.02 g) and homogenised for 15 minutes at 65° C.

Stage 2: A 2-L 3-necked round bottom flask, equipped with a stirrer and thermometer, was loaded with a water phase consisting of water (1045.77 g) and BMA (174.00 g) in a nitrogen atmosphere. A portion of the urethane prepolymer (625.00 g) prepared in Stage 1 (at 60-65° C.) was fed into the reactor over 1 hour, keeping the temperature of the reactor contents below 30° C. After the feed was complete, the mixture was stirred for an additional 5 minutes before chain-extension by the addition of an aqueous 64.45% hydrazine hydrate solution (N$_2$H$_4$.H$_2$O, 11.43 g in 25.00 g H$_2$O). A reactor temperature of 36° C. was reached. Subsequently, a 5% aqueous initiator solution of t-BHPO (18.10 g) and a 1% aqueous solution of Fe$^{III}$.EDTA; 4.63 g) was added to the reaction mixture. The radical polymerisation was started by the addition of a 1% aqueous iAA (45.24 g) and the reaction temperature was allowed to reach 56° C. before more aqueous iAA (45.24 g) was added. The reaction mixture was homogenised for 15 minutes, then cooled to 23° C., filtered over a 200-mesh sieve and collected. The properties of P4 are listed in Table 5.

Preparation of Dispersed Vinyl Polymer P5

A 2-L 3-necked round bottom glass reactor, equipped with stirrer, thermometer and baffles, was loaded with demineralised water (990.94 g), SLS 30% (0.55 g) and NaHCO$_3$ (4.44 g) in a nitrogen atmosphere. The mixture was heated whilst stirring to 80° C. and then a solution of AP (0.89 g) in demineralised water (5.00 g) was added. STY (468.54 g), 2-EHA (361.69 g) and AA (58.00 g) were mixed in a dropping funnel. 10% of this mixture was added to the reactor at 80° C. and remainder was fed into the reactor over 100 minutes at 85° C. The content of a separate dropping funnel, containing demineralised water (50.00 g), AP (0.89 g) and SLS 30% (29.06 g) was added in the same time and the reactor content was kept at 85° C. for 45 minutes and then cooled to 60° C. At 60° C. a burn-up was applied by adding a solution of iAA (2.60 g) in demineralised water (49.00 g) to the reactor followed by a mixture of t-BHPO (80%, 2.40 g) and demineralised water (18.00 g). After 60 minutes the reactor content was cooled to 23° C. The pH was adjusted to 8 to 8.5 with 12.5% aqueous ammonia. The product P5 was filtered and collected. The properties of P5 are listed in Table 5.

Preparation of Dispersed Polymers P6 to P11, P13 and P14

The dispersed polymers P6 to P11, P13 and P14 were prepared using the method described for P5 with the variations as listed in Table 4. The properties of P6 to P11, P13 and P14 are listed in Table 5. P13 has a weight average molecular weight of 22097, a Mn of 10451 and a PDi of 2.11. The Mn's and Mw's of P1 to P12 and P14 could not be measured.

Preparation of a Fatty Acid Functional Dispersed Polymer P12

In a 1 L 3-necked round bottom reactor, equipped with stirrer and N$_2$ inlet, Nouracid LE80 (398.8 g), GMA (201.2 g), Irganox 1010 (0.10 g), Phenothiazine (0.10 g) and benzyl trimethylammonium hydroxide (40 wt % in water; 1.05 g) were loaded. The reactor was purged with nitrogen and the yellow reaction mixture was heated and stirred at 155° C. until the acid value had dropped to 3.7 mg KOH/g. After cooling to ambient temperature, the product was collected and stored under nitrogen.

A portion of 161.3 g of this adduct was mixed with MAA (40.3 g) and transferred into a dropping funnel. This mixture was slowly added over a period of one hour to a 1 L 3-necked round bottom reactor containing a solution of lauroyl peroxide (21.4 g) in butyl glycol (273.0 g) at 125° C. in a nitrogen atmosphere. After complete addition, the resulting copolymer solution was cooled to 50° C. and subsequently concentrated in vacuo to 80% solids using a rotary evaporator. To the resulting yellow solution, a mixture of water (580.0 g), aqueous ammonia (25%; 12.0 g) and SLS (4.4 g) was added at 70° C. A mixture of MMA (225.5 g) and BA (92.5 g) was added to the resulting dispersion and the reaction mixture was stirred for 30 minutes at 70° C. The reaction mixture was heated to 85° C. and a solution of ammonium persulphate (0.86 g) in water (20.0 g) was added over a period of 10 min. The mixture was stirred at 85° C. for 3 h. Then a second portion of ammonium persulphate (0.86 g) in water (20.0 g) was added and the mixture was stirred at 85° C. for 30 minutes. Then a third portion of ammonium persulphate (0.86 g) in water (20.0 g) was added and the mixture was stirred for an additional 30 minutes at 85° C. The resulting dispersion was cooled to 23° C., filtered and stored under nitrogen. The dispersion had a solids content of 39.3%, a pH of 7.7 and contained 2.59% butyl glycol on total dispersion.

Preparation of blends of the dispersed oligomers and dispersed polymers prepared above: The compositional details and properties are listed in Table 6 below.

Preparation of a Blend of Dispersed Oligomer DA1 and Dispersed Polymer P1=A1P1

A 500-mL 3-necked round bottom flask, equipped with a stirrer, was loaded with DA1 (206.60 g) in a nitrogen atmosphere, then P1 (97.60 g) followed by water (95.66 g) was added while stirring the mixture. The blend was stirred for an additional 20 minutes at room temperature and then stored under nitrogen. The blend had a solids content of 25 wt %, and a pH of 6.9.

Preparation of Blends A1P2, A1P3. A1P4, A3P6, A4P7, A5P8, A6P9, A10P1, A12P1 and A1P12

The blends were made according to the same procedure as blend dispersion A1P1, except that no additional water was added, and details are shown in Table 6 below.

Preparation of Blend A2P5

A 500-mL jar was loaded with DA2 (315.00 g) and adipic dihydrazide (10.01 g) in a nitrogen atmosphere and homogenised. Then P5 (88.56 g) was added while stirring the mixture. The blend was stirred for an additional 20 minutes

TABLE 4

| Components (g) | P6 | P7 | P8 | P9 | P10 | P11 | P13 | P14 |
|---|---|---|---|---|---|---|---|---|
| Reactor phase | | | | | | | | |
| Water | 912.19 | 960.66 | 990.94 | 1001.24 | 960.66 | 990.94 | 1001.84 | 952.57 |
| SLS 30% | — | 72.94 | 0.55 | — | 72.94 | 0.55 | — | — |
| Surfactant | 0.83 | — | — | — | — | — | — | 0.92 |
| NaHCO$_3$ | 4.12 | 4.38 | 4.44 | 4.46 | 4.38 | 4.44 | 4.39 | 4.57 |
| Shot at 80° C. | | | | | | | | |
| AP | 0.83 | 0.88 | 0.89 | 0.89 | 0.88 | 0.89 | 0.88 | 0.92 |
| Water | 5.00 | 5.00 | 5.00 | 5.00 | 5.00 | 5.00 | 5.00 | 5.52 |
| Monomer mixture | | | | | | | | |
| STY | — | — | — | — | — | 399.70 | — | — |
| MMA | 577.36 | 332.60 | 617.32 | 352.94 | 759.26 | 124.35 | 346.07 | 611.55 |
| BA | 236.86 | 402.63 | 253.15 | 521.85 | 89.76 | 133.24 | 511.70 | 239.02 |
| BMA | — | — | — | — | — | 204.29 | — | — |
| AA | 16.62 | — | 17.77 | 17.85 | 17.51 | 17.77 | 7.51 | 18.29 |
| MAA | — | 87.53 | — | — | — | — | — | — |
| Dynasilan MEMO | 41.54 | — | — | — | — | — | — | — |
| HEMA | — | 52.52 | — | — | — | — | — | — |
| TEGDMA | — | — | — | — | 8.75 | — | — | — |
| IOTG | — | — | — | — | — | — | 17.01 | — |
| AAEM | — | — | — | — | — | — | — | 45.73 |
| Separate feed | | | | | | | | |
| Water | 50.00 | 50.00 | 50.00 | 50.00 | 50.00 | 50.00 | 50.00 | 52.50 |
| AP | 0.83 | 0.88 | 0.89 | 0.89 | 0.88 | 0.89 | 0.88 | 0.92 |
| SLS 30% | — | — | 29.06 | 14.88 | — | 29.06 | 14.59 | — |
| Surfactant | 123.79 | — | — | — | — | — | — | 136.72 |

P11 only = Burn-up at 60° C. with IAA (0.88 g) water (12 g) tBHPO (0.88 g) and water (26.7 g)

TABLE 5

| Parameter | P1 | P2 | P3 | P4 | P5 | P6 | P7 | P8 | P9 | P10 | P11 | P12 | P13 | P14 |
|---|---|---|---|---|---|---|---|---|---|---|---|---|---|---|
| Solids [wt %] | 51.2 | 45.1 | 50.3 | 35.2 | 42.4 | 44.6 | 21.4 | 45.0 | 45.0 | 44.6 | 44.3 | 39.3 | 44.5 | 44.5 |
| pH | 8.3 | 8.3 | 8.2 | 7.9 | 8.3 | 8.2 | 8.0 | 8.2 | 8.2 | 8.3 | 8.2 | 7.7 | 8.4 | 8.4 |
| Particle size [nm] | 450 | 230 | 330 | 65 | 255 | 390 | 69 | 307 | 590 | 67 | 230 | — | 350 | 406 |
| Measured Tg* [° C.] | 25 | 2 | 24 | 43 | 27 | 58 | 40 | 57 | 2 | 96 | 54 | 49 | −7 | 51 |
| Acid value** | 15.6 | 15.6 | 0 | 12.4 | 50.6 | 15.6 | 63.4 | 15.6 | 15.6 | 15.6 | 15.6 | — | 15.6 | 15.6 |

*with DSC (midpoint)
**Theoretical on solids [mgKOH/g]

at room temperature and then stored under nitrogen. The blend had a solids content of 32.6 wt %, and a pH of 8.2

Preparation of Blend A3A7P10

A 2-L round bottom flask, equipped with a stirrer, was loaded with DA3 (228.22 g) and DA7 (771.78 g) in a nitrogen atmosphere and homogenised at room temperature. Part of this (BA3A7, 225.00 g), was blended with P10 (122.03 g) and water (41.64 g) and homogenised at room temperature and the blend A3A7P10 was stored under nitrogen. The blend had a solids content of 35 wt %, and a pH of 7.2.

Preparation of Blend A3A8A9P11

A 1-L round bottom flask, equipped with a stirrer, was loaded with DA3 (157.14 g) and DA8 (142.86 g) in a nitrogen atmosphere and homogenised at room temperature. A Preparation of Blend A3A8A9P11

A 1-L round bottom flask, equipped with a stirrer, was loaded with DA3 (157.14 g) and DA8 (142.86 g) in a nitrogen atmosphere and homogenised at room temperature. A part of this blend (A3A8, 272.21 g) was blended with DA9 (427.79 g) and then a part of this blend (A3A8A9, 270.00 g) was blended with P11 (124.16 g), homogenised at room temperature and stored under nitrogen. The blend had a solids content of 34.89 wt %, and a pH of 7.4.

Preparation of Blend A11P12

A 500-mL 3-necked round bottom flask, equipped with a stirrer and thermometer was loaded with P12 (140.70 g) in a nitrogen atmosphere, and then heated to 50° C. Subsequently urethane oligomer A11 (100.00 g), which was conditioned at a temperature of 55° C., was fed into the dispersed polymer over a 30 minute period, without exceeding a reactor temperature of 50° C. The batch was cooled to room temperature, after water (24.35 g), and ADH (2.21 g) was added, while the dispersion was stirred. After the batch was mixed for an extra 15 minutes, the batch was filtered over a 200-mesh sieve and collected. The blend has solids content of 41.8% and a pH of 6.8.

Bayer) until a viscosity of 4000 to 6000 mPa·s was reached. The paint formulation was left undisturbed for 24 h, then stirred up to mix the contents intimately, checked (and when necessary corrected) for its viscosity.

Pigment paste C830 comprised $TiO_2$ (24.0 g), propylene glycol (2.4 g), water (3.3 g), AMP-95 (0.2 g), Dehydran 1293 (0.5 g), Surfinol 104E (0.4 g) and NeoCryl BT-24 (3.1 g).

EXAMPLES 2 TO 7a, 8 TO 13

Examples 2 to 7a and 8 to 13 were prepared with the variations and physical properties as listed in Table 7 below using the method described above for Example 1, except that for Example 11b PW602 was used instead of C830.

EXAMPLE 7b

Clear Composition Comprising Blend A3P6

A 500-mL jar, equipped with a stirrer was loaded with blend A3P6 (300.00 g) in a nitrogen atmosphere. Byk 344 (0.90 g) was added followed by Borchigel LM75 until a viscosity of 4000 to 6000 mPa·s was obtained.

Water Resistance:

The water resistance level for Examples 2 and 5 were 5 before recovery and 5 after recovery.

Detergent Resistance:

The detergent resistance level for Example 7a 5 before recovery and 5 after recovery.

COMPARATIVE EXAMPLES 14 to 18

Comparative paint compositions were prepared using the method described above for example 1 with the variations and physical properties as listed in Table 7 below, except that for Example C18 PW602 was used instead of C830.

TABLE 6

|  | A1P2 | A1P3 | A1P4 | A3P6 | A4P7 | A5P8 | A6P9 | A10P1 | A1P12 | A12P1 |
|---|---|---|---|---|---|---|---|---|---|---|
| Oligomer | DA1 | DA1 | DA1 | DA3 | DA4 | DA5 | DA6 | DA10 | DA1 | DA13 |
| Oligomer (g) | 225.00 | 270.00 | 225.00 | 270.00 | 150.00 | 200.00 | 90.00 | 100.00 | 200.00 | 150.00 |
| Oligomer (% of solids) | 50.00 | 50.00 | 50.00 | 60.00 | 40.00 | 40.00 | 15.00 | 50.00 | 50.00 | 50.00 |
| Polymer | P2 | P3 | P4 | P6 | P7 | P8 | P9 | P1 | P13 | P1 |
| Polymer (g) | 120.75 | 129.96 | 154.65 | 117.90 | 259.46 | 192.00 | 295.20 | 39.22 | 111.7 | 95.8 |
| Polymer (% of solids) | 50.00 | 50.00 | 50.00 | 40.00 | 60.00 | 60.00 | 85.00 | 50.00 | 50 | 50 |
| Blend solids (wt %) | 31.50 | 32.70 | 28.70 | 33.90 | 23.40 | 36.74 | 40.60 | 28.85 | 31.9 | 39.9 |
| pH | 7.3 | 7.0 | 7.2 | 7.4 | 7.7 | 6.2 | 7.8 | 7.5 | 6.9 | 7.7 |

EXAMPLE 1

Pigmented Paint Composition Comprising Urethane Oligomer A1

A 500-mL jar, equipped with a stirrer, was loaded with A1 (300 g) and C830 a $TiO_2$-based pigment paste (89.37 g; solids content of 74.9%) in a nitrogen atmosphere, and the mixture was stirred for 30 minutes at ambient temperature. The resulting paint formulation had a solids content of 35.84%. Then a wetting agent (Byk 344, 0.90 g) was added followed by a thickener (Borchigel LM75, available from

COMPARATIVE EXAMPLE C19 (CLEAR)

A 500-mL jar, equipped with a stirrer was loaded with P5 (150.0 g) and butyl glycol (12.72 g) in nitrogen atmosphere, followed by Borchigel LM75 until a viscosity of 4000 to 6000 mPa·s was obtained.

COMPARATIVE EXAMPLE C20 (CLEAR)

P7 was used as prepared above with no additional formulation.

TABLE 7

| EXAMPLE | 1 | 2 | 3 | 4 | 5 | 6 | 7a |
|---|---|---|---|---|---|---|---|
| Dispersion | DA1 | A1P1 | A1P2 | A1P3 | A1P4 | A2P5 | A3P6 |
| Dispersion (g) | 300 | 300 | 300 | 300 | 300 | 300 | 300 |
| Pigment paste TiO$_2$ (g) | 89.37 | 92.32 | 116.32 | 120.76 | 106 | 120.4 | 125.2 |
| Solids (wt %) | 36.4 | 36.7 | 43.6 | 44.8 | 40.8 | 44.7 | 46.0 |
| Open Time (mins) | 50 | 60 | 60 | 48 | 60 | 46 | 32 |
| Wet edge time (mins) | 32 | 25 | 12 | 16 | 24 | 12 | 20 |
| Dust-free time (hours) | 3.5 | 1 | 1.5 | 2.5 | 1.25 | 2 | 2 |
| Tack-free time (hours) | 9 | <15 | 5 | <15 | 15 | 15 | 15 |
| Thumb-hard time (hours) | — | 15.5 | 9 | 15 | 20 | 20 | 23 |
| Sandability time (hours) | — | 22 | 16 | — | 16 | 16 | 22 |
| Yellowing (dark Δb) | 3.5 | 2.5 | 2.2 | 2.5 | 2.4 | 0.3 | 0.3 |
| Yellowing (day Δb) | 1.4 | 0.9 | 0.65 | 1.05 | 1.1 | 0.5 | 0.3 |

| EXAMPLE | 7b | 8 | 9 | 10 | 11a | 11b | 12 |
|---|---|---|---|---|---|---|---|
| Dispersion | A3P6 | A4P7 | A5P8 | A6P9 | A3A7P10 | A3A7P10 | A3A8A9P11 |
| Dispersion (g) | 300 | 300 | 250 | 250 | 240 | 240 | 250 |
| Pigment paste TiO$_2$ (g) | — | 83.4 | 112.93 | 124.83 | 107.2 | PW602, 9.6 | 107.37 |
| Solids (wt %) | 33.9 | 34.0 | 48.6 | 52.0 | 47.3 | 35.5 | 46.9 |
| Open Time (mins) | 36.5 | 37 | 52 | 44 | 60 | 40 | 28 |
| Wet edge time (mins) | 23.5 | 15 | 24 | 20 | 24 | 21 | 14 |
| Dust-free time (hours) | 3.5 | 0.75 | 1.3 | 1 | 1.5 | 1.25 | 1.25 |
| Tack-free time (hours) | 15 | <15 | 19 | 19 | 8 | 8 | 15 |
| Thumb-hard time (hours) | 24 | 15.5 | 22 | 23 | 17.5 | 17 | 22 |
| Sandability time (hours) | — | — | — | — | 16 | — | 22 |
| Yellowing (dark Δb) | — | 1.2 | 2.7 | 1.8 | 2.5 | — | 1.6 |
| Yellowing (day Δb) | — | 0.8 | 1.4 | 1.3 | 0.0 | — | 1.1 |

| EXAMPLE | 13 | C14 | C15 | C16 | C17 | C18 | C19 | C20 |
|---|---|---|---|---|---|---|---|---|
| Dispersion | A11P12 | DA10 | A10P1 | P1 | A1P13 | A12P1 | P5 | P7 |
| Dispersion (g) | 120 | 300 | 100 | 200 | 200 | 200 | 150 | 100 |
| Pigment paste TiO$_2$ (g) | 62.04 | 74.16 | 35.5 | 126 | 78.5 | PW602, 8.0 | — | — |
| Solids (wt %) | 53.2 | 30.3 | 40.9 | 60.4 | 44.01 | 40.2 | 39.1 | 21.4 |
| Open Time (mins) | 42 | 50 | 47 | 9 | 50 | 50 | 35 | 45 |
| Wet edge time (mins) | 14 | 7 | 8 | 4 | 24 | 25 | 7 | 8 |
| Dust-free time (hours) | 1 | 3 | 0.5 | 0.25 | 1.5 | 0.75 | 15 | 30 |
| Tack-free time (hours) | 8 | 6 | 4.5 | 0.5 | 7 | 19 | 1.5 | 0.5 |
| Thumb-hard time (hours) | <16 | — | — | 0.5 | 8.5 | — | 2 | 1 |
| Sandability time (hours) | 5.8 | — | — | — | — | — | — | — |
| Yellowing (dark Δb) | 6.6 | 1.4 | 3.1 | 0.3 | 4.5 | — | — | — |
| Yellowing (day Δb) | — | 0.0 | 1.3 | 0.3 | — | 3.5 | — | — |

Equilibrium Viscosities were Measured for the Examples Listed Below in Tables 8 to 29.

TABLE 8

Example 1:

| Time (min) | Calculated Solids (%) | Shear rate 0.0997 s$^{-1}$ viscosity (Pa·s) | Shear rate 0.990 s$^{-1}$ viscosity (Pa·s) | Shear rate 9.97 s$^{-1}$ viscosity (Pa·s) | Shear rate 78.6 s$^{-1}$ Viscosity (Pa·s) |
|---|---|---|---|---|---|
| 2.0 | 37.04 | 16 | 14 | 9 | 7 |
| 14.0 | 40.97 | 52 | 28 | 18 | 7 |
| 30.0 | 47.27 | 394 | 258 | 74 | — |
| 34.0 | 49.27 | 1770 | 456 | 259 | — |
| 40.0 | 52.32 | 1840 | 471 | 259 | — |
| 43.5 | 54.24 | 821 | 168 | 52 | — |
| 50.0 | 57.7 | 883 | 178 | 54 | — |
| 57.0 | 61.9 | 1770 | 192 | 40 | — |
| 63.5 | 64.93 | 1700 | 193 | 42 | 20 |
| 69.0 | 66.43 | 2080 | 226 | 47 | 21 |

TABLE 9

Example 2

| Time (min) | Calculated Solids (%) | Shear rate 0.0997 s$^{-1}$ viscosity (Pa·s) | Shear rate 0.990 s$^{-1}$ viscosity (Pa·s) | Shear rate 9.97 s$^{-1}$ viscosity (Pa·s) | Shear rate 78.6 s$^{-1}$ viscosity (Pa·s) |
|---|---|---|---|---|---|
| 1.5 | 37.62 | 67 | 20 | 11 | 4 |
| 8.5 | 40.38 | 118 | 28 | 15 | — |
| 14.5 | 43.07 | 152 | 47 | 26 | 7 |
| 21.0 | 46.33 | 174 | 73 | 34 | 13 |
| 28.5 | 50.53 | 225 | 100 | 61 | — |
| 31.5 | 52.34 | 308 | 149 | 83 | — |
| 36.5 | 55.53 | 535 | 265 | 94 | — |
| 39.5 | 57.55 | 925 | 368 | — | — |
| 40.0 | 60.71 | 2050 | 516 | 106 | — |
| 44.0 | 62.91 | 2510 | 562 | 112 | — |

TABLE 10

Example 3:

| Time (min) | Calculated Solids (%) | Shear rate 0.0997 s$^{-1}$ viscosity (Pa · s) | Shear rate 0.990 s$^{-1}$ viscosity (Pa · s) | Shear rate 9.97 s$^{-1}$ viscosity (Pa · s) | Shear rate 78.6 s$^{-1}$ viscosity (Pa · s) |
|---|---|---|---|---|---|
| 3.0 | 45.22 | 176 | 46 | 17 | 7 |
| 11.0 | 48.71 | 358 | 65 | 26 | 10 |
| 22.0 | 53.91 | 513 | 103 | 52 | 15 |
| 28.5 | 57.22 | 427 | 159 | 70 | — |
| 35.0 | 60.69 | 1630 | 363 | 75 | — |
| 40.0 | 63.48 | 2460 | 515 | — | — |
| 46.0 | 66.95 | 2390 | 492 | 105 | — |
| 52.0 | 70.57 | 11100 | — | — | — |

TABLE 11

Example 4:

| Time (min) | Calculated Solids (%) | Shear rate 0.0997 s$^{-1}$ viscosity (Pa · s) | Shear rate 0.990 s$^{-1}$ viscosity (Pa · s) | Shear rate 9.97 s$^{-1}$ viscosity (Pa · s) | Shear rate 78.6 s$^{-1}$ viscosity (Pa · s) |
|---|---|---|---|---|---|
| 1.0 | 45.01 | 126 | 23 | 11 | 4 |
| 7.0 | 47.50 | 113 | 25 | 13 | 5 |
| 13.0 | 50.14 | 235 | 44 | 22 | 9 |
| 17.5 | 52.21 | 153 | 52 | 27 | 11 |
| 24.0 | 55.36 | 275 | 104 | 48 | 19 |
| 28.0 | 57.39 | 337 | 134 | 56 | — |
| 34.0 | 60.57 | 1530 | 303 | 76 | — |
| 39.0 | 63.36 | 2520 | 482 | 117 | — |
| 46.0 | 67.48 | 18200 | 3890 | 285 | — |
| 52.0 | 71.22 | 30800 | 8070 | — | — |
| 57.0 | 74.50 | 28000 | — | — | — |

TABLE 12

Example 5:

| Time (min) | Calculated Solids (%) | Shear rate 0.0997 s$^{-1}$ viscosity (Pa · s) | Shear rate 0.990 s$^{-1}$ viscosity (Pa · s) | Shear rate 9.97 s$^{-1}$ viscosity (Pa · s) | Shear rate 78.6 s$^{-1}$ viscosity (Pa · s) |
|---|---|---|---|---|---|
| 0.0 | 41.06 | 187 | 50 | 17 | 8 |
| 7.0 | 43.17 | 275 | 54 | 21 | 9 |
| 13.0 | 45.22 | 424 | 92 | 35 | 13 |
| 19.0 | 47.47 | 727 | 163 | 53 | 17 |
| 23.5 | 49.29 | 594 | 152 | 50 | 129 |
| 30.0 | 52.13 | 1920 | 543 | 122 | — |
| 34.5 | 54.25 | 3160 | 699 | 165 | — |
| 40.0 | 56.99 | 6840 | 1030 | 255 | — |
| 44.0 | 59.09 | 9840 | 1520 | 300 | — |
| 50.0 | 62.42 | 41100 | — | — | — |

TABLE 13

Example 6:

| Time (min) | Calculated Solids (%) | Shear rate 0.0997 s$^{-1}$ viscosity (Pa · s) | Shear rate 0.990 s$^{-1}$ viscosity (Pa · s) | Shear rate 9.97 s$^{-1}$ viscosity (Pa · s) | Shear rate 78.6 s$^{-1}$ viscosity (Pa · s) |
|---|---|---|---|---|---|
| 2.0 | 45.83 | 74 | 34 | 16 | — |
| 14.0 | 51.09 | 77 | 32 | 16 | 10 |
| 18.0 | 52.76 | 85 | 42 | 22 | 12 |
| 24.0 | 55.28 | 111 | 55 | 30 | — |
| 29.0 | 57.44 | 165 | 77 | 40 | — |
| 39.0 | 61.82 | 425 | 134 | 58 | — |

TABLE 13-continued

Example 6:

| Time (min) | Calculated Solids (%) | Shear rate 0.0997 s$^{-1}$ viscosity (Pa · s) | Shear rate 0.990 s$^{-1}$ viscosity (Pa · s) | Shear rate 9.97 s$^{-1}$ viscosity (Pa · s) | Shear rate 78.6 s$^{-1}$ viscosity (Pa · s) |
|---|---|---|---|---|---|
| 47.0 | 65.15 | 4130 | 663 | 163 | — |
| 53.0 | 67.25 | 7290 | 1170 | 208 | — |
| 58.0 | 68.56 | — | 2260 | 435 | — |

TABLE 14

Example 7a:

| Time (min) | Calculated Solids (%) | Shear rate 0.0997 s$^{-1}$ viscosity (Pa · s) | Shear rate 0.990 s$^{-1}$ viscosity (Pa · s) | Shear rate 9.97 s$^{-1}$ viscosity (Pa · s) | Shear rate 78.6 s$^{-1}$ viscosity (Pa · s) |
|---|---|---|---|---|---|
| 3.0 | 47.00 | 52 | 24 | 9 | 5 |
| 12.0 | 51.92 | 124 | 41 | 18 | 7 |
| 22.0 | 57.40 | 253 | 58 | 29 | 14 |
| 27.0 | 60.13 | 413 | 111 | 55 | 17 |
| 34.0 | 63.96 | 468 | 123 | 64 | — |
| 37.0 | 65.60 | 1120 | 244 | 107 | — |
| 45.0 | 69.98 | 2650 | 526 | 132 | — |
| 49.0 | 72.17 | 3860 | 807 | 184 | — |

TABLE 15

Example 7b:

| Time (min) | Calculated Solids (%) | Shear rate 0.0997 s$^{-1}$ viscosity (Pa · s) | Shear rate 0.990 s$^{-1}$ viscosity (Pa · s) | Shear rate 9.97 s$^{-1}$ viscosity (Pa · s) | Shear rate 78.6 s$^{-1}$ viscosity (Pa · s) |
|---|---|---|---|---|---|
| 1.5 | 34.53 | 5 | 14 | 5 | — |
| 12.5 | 38.69 | 6 | 9 | 9 | 7 |
| 23.0 | 42.89 | 40 | 31 | 17 | 11 |
| 32.0 | 46.76 | 62 | 52 | 41 | — |
| 43.0 | 51.72 | 162 | 114 | 80 | — |
| 47.5 | 53.73 | 201 | 140 | 95 | — |
| 57.0 | 57.67 | 294 | 191 | 123 | — |
| 62.5 | 59.58 | 531 | 267 | 169 | — |
| 68.0 | 61.06 | 826 | 367 | 202 | — |
| 72.5 | 61.85 | 3320 | 1060 | 576 | — |

TABLE 16

Example 8:

| Time (min) | Calculated Solids (%) | Shear rate 0.0997 s$^{-1}$ viscosity (Pa · s) | Shear rate 0.990 s$^{-1}$ viscosity (Pa · s) | Shear rate 9.97 s$^{-1}$ viscosity (Pa · s) | Shear rate 78.6 s$^{-1}$ viscosity (Pa · s) |
|---|---|---|---|---|---|
| 1.5 | 34.2 | 37 | 10 | 5 | 2 |
| 7.0 | 35.2 | — | 14 | 7 | 3 |
| 17.0 | 37.2 | 56 | 16 | 6 | 2 |
| 27.5 | 39.4 | 318 | 68 | 21 | — |
| 36.0 | 41.5 | 390 | 136 | 39 | 17 |
| 52.0 | 45.0 | 2160 | 612 | — | — |
| 56.5 | 46.1 | 1670 | 434 | 126 | — |
| 62.5 | 47.6 | 1020 | 256 | 67 | — |
| 67.5 | 48.9 | 1170 | 244 | — | — |
| 85.5 | 53.8 | 3410 | 677 | — | — |
| 92.5 | 55.8 | 4490 | — | — | — |
| 94.0 | 56.3 | 15000 | — | — | — |

TABLE 17

Example 9:

| Time (min) | Calculated Solids (%) | Shear rate 0.0997 s$^{-1}$ viscosity (Pa · s) | Shear rate 0.990 s$^{-1}$ viscosity (Pa · s) | Shear rate 9.97 s$^{-1}$ viscosity (Pa · s) | Shear rate 78.6 s$^{-1}$ viscosity (Pa · s) |
|---|---|---|---|---|---|
| 1.5  | 49.24 | 78   | 10  | 2  | 1 |
| 6.5  | 51.61 | 70   | 10  | 3  | 1 |
| 12.0 | 54.28 | 94   | 15  | 4  | 2 |
| 20.0 | 58.26 | 209  | 24  | 5  | 2 |
| 30.0 | 63.53 | 868  | 120 | 20 | 7 |
| 33.0 | 65.14 | 1340 | 154 | 25 | 8 |
| 38.5 | 68.16 | 2220 | 246 | 34 | — |
| 42.0 | 70.12 | 3030 | 378 | 55 | — |
| 47.0 | 72.97 | 4920 | 768 | 93 | — |
| 49.5 | 74.42 | 6790 | 925 | —  | — |

TABLE 18

Example 10:

| Time (min) | Calculated Solids (%) | Shear rate 0.0997 s$^{-1}$ viscosity (Pa · s) | Shear rate 0.990 s$^{-1}$ viscosity (Pa · s) | Shear rate 9.97 s$^{-1}$ viscosity (Pa · s) | Shear rate 78.6 s$^{-1}$ viscosity (Pa · s) |
|---|---|---|---|---|---|
| 2.5  | 53.23 | 234   | 38   | 11  | 4 |
| 7.0  | 55.75 | 275   | 72   | 22  | 8 |
| 13.0 | 59.25 | 750   | 132  | 40  | — |
| 18.5 | 62.60 | 849   | 249  | 75  | — |
| 25.0 | 66.71 | 1380  | 414  | 130 | — |
| 32.5 | 71.68 | 2590  | 620  | —   | — |
| 37.5 | 75.12 | 7210  | 1150 | 266 | — |
| 43.5 | 79.39 | 29700 | —    | —   | — |

TABLE 19

Example 11a:

| Time (min) | Calculated Solids (%) | Shear rate 0.0997 s$^{-1}$ viscosity (Pa · s) | Shear rate 0.990 s$^{-1}$ viscosity (Pa · s) | Shear rate 9.97 s$^{-1}$ viscosity (Pa · s) | Shear rate 78.6 s$^{-1}$ viscosity (Pa · s) |
|---|---|---|---|---|---|
| 2.0  | 48.47 | 222   | 34   | 9   | 4 |
| 6.5  | 51.38 | —     | 33   | 12  | 6 |
| 12.0 | 54.92 | 259   | 63   | 19  | 9 |
| 15.0 | 56.87 | 364   | 63   | 21  | 10 |
| 20.0 | 60.28 | 433   | 86   | 29  | 13 |
| 24.0 | 62.81 | 718   | 160  | 52  | 20 |
| 28.0 | 65.99 | 1450  | 350  | 102 | — |
| 32.0 | 69.03 | 4330  | 1150 | 222 | — |
| 37.0 | 72.69 | 8670  | 2160 | 372 | — |
| 40.5 | 74.42 | 15800 | 3380 | 535 | — |

TABLE 20

Example 11b:

| Time (min) | Calculated Solids (%) | Shear rate 0.0997 s$^{-1}$ viscosity (Pa · s) | Shear rate 0.990 s$^{-1}$ viscosity (Pa · s) | Shear rate 9.97 s$^{-1}$ viscosity (Pa · s) | Shear rate 78.6 s$^{-1}$ viscosity (Pa · s) |
|---|---|---|---|---|---|
| 1.00  | 35.5 | 40   | 17  | 7  | 4 |
| 8.50  | 37.5 | 140  | 37  | 12 | 7 |
| 17.00 | 40.5 | 238  | 73  | 19 | 7 |
| 26.00 | 44.5 | 265  | 80  | 19 | 15 |
| 33.00 | 48.2 | 645  | 182 | 48 | — |
| 39.50 | 52.1 | 1570 | 352 | —  | — |
| 43.00 | 54.4 | 2330 | 622 | —  | — |

TABLE 20-continued

Example 11b:

| Time (min) | Calculated Solids (%) | Shear rate 0.0997 s$^{-1}$ viscosity (Pa · s) | Shear rate 0.990 s$^{-1}$ viscosity (Pa · s) | Shear rate 9.97 s$^{-1}$ viscosity (Pa · s) | Shear rate 78.6 s$^{-1}$ viscosity (Pa · s) |
|---|---|---|---|---|---|
| 46.00 | 56.4 | 3510 | 848  | — | — |
| 51.00 | 60.1 | 4310 | 958  | — | — |
| 53.00 | 61.6 | 5340 | 1140 | — | — |

TABLE 21

Example 12:

| Time (min) | Calculated Solids (%) | Shear rate 0.0997 s$^{-1}$ viscosity (Pa · s) | Shear rate 0.990 s$^{-1}$ viscosity (Pa · s) | Shear rate 9.97 s$^{-1}$ viscosity (Pa · s) | Shear rate 78.6 s$^{-1}$ viscosity (Pa · s) |
|---|---|---|---|---|---|
| 2.0  | 47.70 | 49    | 31   | 11 | 6 |
| 8.5  | 50.56 | 90    | 32   | 15 | 9 |
| 17.0 | 54.65 | 178   | 56   | 32 | 15 |
| 19.0 | 55.67 | 301   | 77   | 40 | — |
| 25.0 | 58.87 | 474   | 124  | 60 | — |
| 29.0 | 61.11 | 666   | 176  | 78 | — |
| 34.0 | 64.04 | 1110  | 242  | 88 | — |
| 37.0 | 65.87 | 1520  | 300  | —  | — |
| 42.0 | 69.03 | 4240  | 671  | —  | — |
| 46.0 | 71.65 | 12900 | 1540 | —  | — |

TABLE 22

Example 13:

| Time (min) | Calculated Solids (%) | Shear rate 0.0997 s$^{-1}$ viscosity (Pa · s) | Shear rate 0.990 s$^{-1}$ viscosity (Pa · s) | Shear rate 9.97 s$^{-1}$ viscosity (Pa · s) | Shear rate 78.6 s$^{-1}$ viscosity (Pa · s) |
|---|---|---|---|---|---|
| 2.0  | 54.19 | 52    | 23   | 9   | 5 |
| 7.0  | 56.08 | 217   | 27   | 12  | — |
| 13.0 | 58.33 | 322   | 65   | 24  | 11 |
| 18.0 | 60.22 | 660   | 101  | 35  | 14 |
| 24.0 | 62.47 | 1550  | 440  | 116 | — |
| 28.0 | 63.98 | 4360  | 1010 | 130 | — |
| 33.0 | 65.86 | 10800 | 2190 | —   | — |
| 36.0 | 66.99 | 20500 | 3640 | —   | — |

TABLE 23

Example C14:

| Time (min) | Calculated Solids (%) | Shear rate 0.0997 s$^{-1}$ viscosity (Pa · s) | Shear rate 0.990 s$^{-1}$ viscosity (Pa · s) | Shear rate 9.97 s$^{-1}$ viscosity (Pa · s) | Shear rate 78.6 s$^{-1}$ viscosity (Pa · s) |
|---|---|---|---|---|---|
| 2.5  | 31.56 | 270  | 85   | 19  | 3 |
| 15.0 | 34.96 | 319  | 140  | 32  | 6 |
| 23.5 | 37.71 | 557  | 201  | 50  | — |
| 30.5 | 40.25 | 822  | 262  | 66  | — |
| 36.5 | 42.62 | 1850 | 427  | 96  | — |
| 41.5 | 44.73 | 3300 | 618  | 121 | — |
| 47.5 | 47.44 | 5620 | 1020 | —   | — |
| 53.5 | 50.32 | 6170 | 1120 | —   | — |

TABLE 24

Example C15

| Time (min) | Calculated Solids (%) | Shear rate 0.0997 s$^{-1}$ viscosity (Pa·s) | Shear rate 0.990 s$^{-1}$ viscosity (Pa·s) | Shear rate 9.97 s$^{-1}$ viscosity (Pa·s) |
|---|---|---|---|---|
| 1.5 | 41.4 | 231 | 43 | 16 |
| 6.0 | 42.68 | 391 | 93 | 32 |
| 12.5 | 44.4 | 724 | 201 | 63 |
| 17.0 | 45.95 | 1960 | 318 | — |
| 23.5 | 47.96 | 1520 | 559 | 133 |
| 27.5 | 49.33 | 2230 | 836 | — |
| 33.0 | 51.41 | 2180 | 1050 | — |
| 37.5 | 53.15 | 5140 | 2150 | — |

TABLE 25

Example C16:

| Time (min) | Calculated Solids (%) | Shear rate 0.0997 s$^{-1}$ viscosity (Pa·s) | Shear rate 0.990 s$^{-1}$ viscosity (Pa·s) | Shear rate 9.97 s$^{-1}$ viscosity (Pa·s) | Shear rate 78.6 s$^{-1}$ viscosity (Pa·s) |
|---|---|---|---|---|---|
| 0.50 | 61.21 | 1650 | 54 | 23 | 5.98 |
| 6.00 | 64.24 | 2220 | 161 | — | — |
| 10.00 | 66.44 | 2510 | 203 | — | — |
| 13.00 | 68.09 | 4280 | 360 | — | — |
| 21.00 | 72.49 | 5830 | — | — | — |

TABLE 26

Example C17:

| Time (min) | Calculated Solids (%) | Shear rate 0.0997 s$^{-1}$ viscosity (Pa·s) | Shear rate 0.990 s$^{-1}$ viscosity (Pa·s) | Shear rate 9.97 s$^{-1}$ viscosity (Pa·s) | Shear rate 78.6 s$^{-1}$ viscosity (Pa·s) |
|---|---|---|---|---|---|
| 4.00 | 45.37 | 38 | 21 | 14 | 8 |
| 13.00 | 48.20 | 60 | 31 | 22 | — |
| 23.00 | 51.53 | — | 45 | 30 | — |
| 28.00 | 53.35 | 102 | 61 | — | — |
| 37.50 | 57.16 | 265 | 118 | 41 | — |
| 44.50 | 60.25 | 288 | 144 | 57 | — |
| 53.00 | 64.21 | 667 | 268 | — | — |
| 57.00 | 66.10 | 645 | 255 | — | — |
| 67.00 | 70.67 | 1150 | 314 | — | — |
| 76.00 | 74.18 | 2340 | 389 | — | — |
| 85.00 | 76.55 | 38500 | — | — | — |

TABLE 27

Example C18:

| Time (min) | Calculated Solids (%) | Shear rate 0.0997 s$^{-1}$ viscosity (Pa·s) | Shear rate 0.990 s$^{-1}$ viscosity (Pa·s) | Shear rate 9.97 s$^{-1}$ viscosity (Pa·s) | Shear rate 78.6 s$^{-1}$ viscosity (Pa·s) |
|---|---|---|---|---|---|
| 4.00 | 41.83 | 41 | 26 | 10 | 2 |
| 9.00 | 43.65 | 55 | 36 | 15 | 3 |
| 13.00 | 45.02 | 85 | 48 | 18 | 4 |
| 18.00 | 46.74 | 117 | 58 | 20 | 4 |
| 24.00 | 49.01 | 170 | 72 | 23 | — |
| 30.00 | 51.66 | 284 | 87 | 28 | — |
| 34.00 | 53.69 | 309 | 92 | 30 | 6 |
| 38.00 | 55.95 | 344 | 88 | 33 | — |
| 44.00 | 57.46 | 359 | 81 | — | — |
| 49.00 | 60.33 | 327 | 72 | — | — |
| 54.00 | 63.46 | 396 | 94 | 34 | — |
| 59.00 | 66.62 | 268 | 96 | 40 | 6 |
| 70.00 | 74.40 | 259 | 121 | 54 | 11 |
| 75.00 | 77.60 | 850 | 188 | 75 | — |
| 78.00 | 79.19 | — | — | — | — |
| 83.00 | 81.31 | 5070 | 604 | — | — |

TABLE 28

Example C19

| Time (min) | Calculated Solids (%) | Shear rate 0.0997 s$^{-1}$ viscosity (Pa·s) | Shear rate 0.990 s$^{-1}$ viscosity (Pa·s) | Shear rate 9.97 s$^{-1}$ viscosity (Pa·s) | Shear rate 78.6 s$^{-1}$ viscosity (Pa·s) |
|---|---|---|---|---|---|
| 3.0 | 41.74 | 506 | 104 | 16 | 3 |
| 9.0 | 46.28 | 1465 | 341 | 59 | 13 |
| 14.5 | 50.99 | 5043 | 1334 | 305 | 51 |
| 23.0 | 59.16 | 16240 | 5356 | 910 | 193 |
| 29.0 | 65.50 | 22290 | 12750 | 2040 | 448 |

TABLE 29

Example C20

| Time (min) | Calculated Solids (%) | Shear rate 0.0997 s$^{-1}$ viscosity (Pa·s) | Shear rate 0.990 s$^{-1}$ viscosity (Pa·s) | Shear rate 9.97 s$^{-1}$ viscosity (Pa·s) | Shear rate 78.6 s$^{-1}$ viscosity (Pa·s) |
|---|---|---|---|---|---|
| 0. | 22.20 | 68 | 28 | 10 | 3 |
| 5.0 | 24.03 | 120 | 56 | 18 | 4 |
| 12.0 | 26.54 | 1156 | 422 | 82 | 15 |
| 18.0 | 28.93 | 5804 | 1588 | 212 | 33 |
| 24.0 | 31.81 | 8118 | 2073 | 289 | 69 |
| 31.0 | 36.13 | 12560 | 4273 | 568 | 116 |
| 38.0 | 41.88 | 12720 | 3278 | 415 | 78 |
| 44.0 | 48.27 | 33020 | 8738 | 1087 | 186 |

The invention claimed is:

1. An aqueous coating composition comprising a physical blend of a crosslinkable water-dispersible polyurethane oligomer(s) and 10 to 56 wt % of a dispersed vinyl polymer, 0 to 25% of co-solvent by weight of the composition, said polyurethane oligomer(s) having:
   a) a measured weight average molecular weight in the range of from 1,500 to 50,000 Daltons; and
   b) a solution viscosity $\leq$150 Pa·s, as determined from an 80% by weight solids solution of the crosslinkable polyurethane oligomer(s) in at least one of the solvents selected from the group consisting of N-methylpyrrolidone, n-butylglycol and mixtures thereof, using a shear rate of 90±5 s$^{-1}$ and at 50±2° C.; and
said dispersed vinyl polymer(s) having:
   a) a measured weight average molecular weight $\geq$90,000 Daltons; and
   b) an acid value up to 100 mgKOH/g;
said composition when drying to form a coating having the following properties:
   i) an open time of at least 20 minutes;
   ii) a wet edge time of at least 10 minutes;
   iii) a tack-free time of $\leq$20 hours;

iv) an equilibrium viscosity of $\leq 5{,}000$ Pa·s, at any solids content when drying in the range of from 20 to 55% by weight of the composition, using any shear rate in the range of from $9\pm 0.5$ to $90\pm 5$ s$^{-1}$ and at $23+2°$ C.; and wherein the crosslinkable water-dispersible polyurethane oligomer(s) is crosslinkable by autooxidation optionally in combination with silane or Schiff base condensation.

2. An aqueous coating composition according to claim 1 wherein said polyurethane oligomer(s) has a solution viscosity $\leq 250$ Pa·s, as determined from a 70% by weight solids solution of the crosslinkable polyurethane oligomer(s) in a solvent mixture consisting of:
  i) at least one of the solvents selected from the group consisting of N-methylpyrrolidone, n-butylglycol and mixtures thereof;
  ii) water and
  iii) N,N-dimethylethanolamine;
  where i), ii) and iii) are in weight ratios of 20/7/3 respectively, using a shear rate of $90\pm 5$ s$^{-1}$ and at $23\pm 2°$ C.

3. An aqueous coating composition comprising a physical blend of a crosslinkable water-dispersible polyurethane oligomer(s) which is crosslinkable by autooxidation and 10 to 56 wt % of a dispersed polymer(s) and 0 to 25% of co-solvent by weight of the composition, said crosslinkable water-dispersible polyurethane oligomer(s) having:
  a) a measured weight average molecular weight in the range of from 1,500 to 50,000 Daltons; and
  b) a solution viscosity $\leq 150$ Pa·s, as determined from an 80% by weight solids solution of the crosslinkable water-dispersible polyurethane oligomer(s) in at least one of the solvents selected from the group consisting of N-methylpyrrolidone, n-butylglycol and mixtures thereof, using a shear rate of $90\pm 5$ s$^{-1}$ and at $50\pm 2°$ C.;
and said dispersed polymer(s) having:
  a) a measured weight average molecular weight $\geq 90{,}000$ Daltons; and
  b) an acid value up to 100 mgKOH/g;
wherein said composition when drying to form a coating has the following properties:
  i) an open time of at least 20 minutes;
  ii) a wet edge time of at least 10 minutes;
  iii) a tack-free time of $\leq 20$ hours; and
  iv) an equilibrium viscosity of $\leq 5{,}000$ Pa·s, at any solids content when drying in the range of from 20 to 55% by weight of the composition, using any shear rate in the range of from $9\pm 0.5$ to $90\pm 5$ s$^{-1}$ and at $23\pm 2°$ C.

4. An aqueous composition according to claim 3 wherein the crosslinkable water-dispersible polyurethane oligomer(s) contains autooxidisable groups and carbonyl functional groups.

5. An aqueous coating composition comprising a physical blend of a crosslinkable water-dispersible polyurethane oligomer(s) which is crosslinkable by autooxidation and a dispersed polymer(s) in a ratio by weight of 90:10 to 10:90, and 0 to 25% of co-solvent by weight of the composition, said polyurethane oligomer(s):
  a) having a measured weight average molecular weight in the range of from 1,500 to 50,000 Daltons;
  b) having a solution viscosity $\leq 150$ Pa·s, as determined from an 80% by weight solids solution of the crosslinkable polyurethane oligomer(s) in at least one of the solvents selected from the group consisting of N-methylpyrrolidone, n-butylglycol and mixtures thereof, using a shear rate of $90\pm 5$ s$^{-1}$ and at $50\pm 2°$ C.; and
  c) being obtained by capping an isocyanate-terminated polyurethane oligomer with a monofunctional isocyanate-reactive compound and/or by using a stoichiometric excess of reactants having isocyanate-reactive groups during the oligomer preparation;
said dispersed polymer(s) having:
  a) a measured weight average molecular weight $\geq 90{,}000$ Daltons; and
  b) an acid value up to 100 mgKOH/g;
wherein said composition when drying to form a coating has the following properties:
  i) an open time of at least 20 minutes;
  ii) a wet edge time of at least 10 minutes;
  iii) a tack-free time of $\leq 20$ hours;
  iv) an equilibrium viscosity of $\leq 5{,}000$ Pa·s, at any solids content when drying in the range of from 20 to 55% by weight of the composition, using any shear rate in the range of from $9\pm 0.5$ to $90\pm 5$ s$^{-1}$ and at $23\pm 2°$ C.

* * * * *